(12) United States Patent  
Amirghodsi et al.

(10) Patent No.: US 11,507,777 B2
(45) Date of Patent: Nov. 22, 2022

(54) LABELING TECHNIQUES FOR A MODIFIED PANOPTIC LABELING NEURAL NETWORK

(71) Applicant: Adobe Inc., San Jose, CA (US)

(72) Inventors: Sohrab Amirghodsi, Seattle, WA (US); Zhe Lin, Fremont, CA (US); Yilin Wang, Sunnyvale, CA (US); Tianshu Yu, Tempe, AZ (US); Connelly Barnes, Seattle, WA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 374 days.

(21) Appl. No.: 15/930,539

(22) Filed: May 13, 2020

(65) Prior Publication Data

US 2021/0357684 A1 Nov. 18, 2021

(51) Int. Cl.
*G06K 9/62* (2022.01)
*G06V 10/75* (2022.01)
(Continued)

(52) U.S. Cl.
CPC ........... *G06K 9/6256* (2013.01); *G06F 17/18* (2013.01); *G06K 9/6215* (2013.01);
(Continued)

(58) Field of Classification Search
CPC .... G06V 10/72; G06V 10/757; G06V 10/759; G06V 10/764; G06V 10/82; G06T 7/11;
(Continued)

(56) References Cited

U.S. PATENT DOCUMENTS

2018/0157743 A1* 6/2018 Hori et al. ........... G06N 3/0445
2020/0012898 A1* 1/2020 Zhao et al. ............ G06V 10/82
(Continued)

OTHER PUBLICATIONS

Bertalmio et al., "Navier-Stokes, Fluid Dynamics, and Image and Video Inpainting", CVPR, IEEE Computer Society Conference on Computer Vision and Pattern Recognition, 2001.
(Continued)

*Primary Examiner* — Andrew W Johns
(74) *Attorney, Agent, or Firm* — Kilpatrick Townsend & Stockton LLP

(57) ABSTRACT

A panoptic labeling system includes a modified panoptic labeling neural network ("modified PLNN") that is trained to generate labels for pixels in an input image. The panoptic labeling system generates modified training images by combining training images with mask instances from annotated images. The modified PLNN determines a set of labels representing categories of objects depicted in the modified training images. The modified PLNN also determines a subset of the labels representing categories of objects depicted in the input image. For each mask pixel in a modified training image, the modified PLNN calculates a probability indicating whether the mask pixel has the same label as an object pixel. The modified PLNN generates a mask label for each mask pixel, based on the probability. The panoptic labeling system provides the mask label to, for example, a digital graphics editing system that uses the labels to complete an infill operation.

20 Claims, 10 Drawing Sheets

(51) Int. Cl.
  *G06F 17/18* (2006.01)
  *G06N 3/08* (2006.01)
  *G06N 20/00* (2019.01)

(52) U.S. Cl.
  CPC ......... *G06K 9/6228* (2013.01); *G06K 9/6232* (2013.01); *G06N 3/08* (2013.01); *G06N 20/00* (2019.01); *G06V 10/757* (2022.01)

(58) Field of Classification Search
  CPC .. G06K 9/6215; G06K 9/6228; G06K 9/6267; G06N 3/08; G06N 20/00
  See application file for complete search history.

(56) References Cited

U.S. PATENT DOCUMENTS

2020/0074638 A1* 3/2020 Yang et al. ............... G06T 7/97
2020/0349464 A1* 11/2020 Lin et al. ............... G06N 3/084

OTHER PUBLICATIONS

Malkov et al., "Efficient and robust approximate nearest neighbor search using hierachical navigable small world graphs", IEEE Transactions on Journal Name, 2018.
Simonyan et al., "Very Deep Convolutional Networks for Large-Scale Image Recognition", Visual Geometry Group, Department of Engineering Science, University of Oxford, 2015.
Xiong et al., "Foreground-aware Image Inpainting", University of Rochester, University of Illinois at Urbana-Chanpaign, Adobe Research, 2019, 5840-5848.
Xiong et al., "Upsnet: A United Panoptic Segmentation Network", Uber ATG, University of Toronto, The Chinese University of Hong Kong, 2019, 8818-8826.
Zeng et al., "Learning Pyramid-Context Encoder Network for High-Quality Image Inpainting", School of Data and Computer Science, Sun Yat-sen University, Guangzhou, P.R. China, The Key Laboratory of Machine Intelligence and Advanced Computing (Sun Yat-sen University),, 2019, 1486-1494.

* cited by examiner

LABELING TECHNIQUES FOR A MODIFIED PANOPTIC LABELING NEURAL NETWORK

TECHNICAL FIELD

This disclosure relates generally to the field of digital image processing, and more specifically relates to neural networks for labeling objects depicted in a digital graphical image.

BACKGROUND

In digital image processing, segmentation techniques are used to automatically identify the depicted contents of a digital graphical image. Segmenting an image identifies, for example, objects that are depicted in the image. Panoptic segmentation is an analysis technique performed via one or more neural networks, in which a panoptic labeling neural network assigns a label to an object. In some cases, the label indicates an object type or category, such as objects having a category of "person," "car," "tree," "water" or other suitable categories. In some cases, multiple object instances may have a particular category, such as a particular image with several objects labeled as "person."

Segmentation of an image provides information about the image, such as by identifying the contents of an image. The segmentation information, including the object labels, can be used by a digital graphics editing system to perform an infill operation, such as modifying pixels to replace content in an image. However, some existing systems for segmentation train a panoptic labeling neural network based on naïve infill shapes, such as rectangles. The naïve panoptic labeling neural network may misidentify object labels in an image, and provide poor segmentation information to the digital graphics editing system, which may incorrectly perform the infill operation. An image that has misidentified labels may have pixels incorrectly modified by the infill operation, such as pixels with modified content that does not match the content of surrounding pixels. In some cases, an incorrectly infilled image appears artificial, or may seem to have poorly matched content between modified pixels and unmodified pixels.

It is desirable to provide a modified panoptic labeling neural network that is capable of providing segmentation information. In some cases, it is desirable for the modified panoptic labeling neural network to be trained based on infill shapes that are comparable to the image being modified.

SUMMARY

According to certain embodiments, a panoptic labeling system receives an input image that is included in a group of training images. The panoptic labeling system extracts a feature vector of the input image. For each annotated image in an annotated image library, the panoptic labeling system extracts an additional feature vector of the annotated image. The annotated image library excludes the input image and the group of training images. In some implementations, the panoptic labeling system compares the feature vector of the input image to each additional feature vector of each annotated image. Based on the comparison, the panoptic labeling system determines an annotated image having a respective feature vector that is within a similarity threshold of the feature vector. Responsive to determining that the respective feature vector is within the similarity threshold, the panoptic labeling system selects a mask instance from the annotated image. In some embodiments, the panoptic labeling system determines, for each mask pixel in the mask instance, a probability of the mask pixel having a label that represents a category of an object depicted in the input image. For each mask pixel in the mask instance, the panoptic labeling system generates a mask label for the mask pixel, wherein the mask label is based on the probability.

In some embodiments, a panoptic labeling system receives an input image and a mask instance. The input image is included in a group of training images. The mask instance describes an annotated object depicted in an annotated image that is not included in the group of training images. The panoptic labeling system determines a set of labels. Each label in the set of labels represents a category of an object depicted in a training image of the group of training images. In some implementations, the panoptic labeling system determines a subset of the set of labels. Each label in the subset represents a respective category of a respective object depicted in the input image. For each mask pixel in the mask instance, a modified panoptic labeling neural network included in the panoptic labeling system determines a distance between the mask pixel and an object pixel in the input image, wherein the object pixel has a respective label from the subset. Based on the distance, the modified panoptic labeling neural network determines a respective probability of the mask pixel having the respective label from the subset. For each mask pixel, the modified panoptic labeling neural network generates a mask label for the mask pixel, wherein the mask label is based on the respective probability. The panoptic labeling system provides the mask label to a digital graphics editing system.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
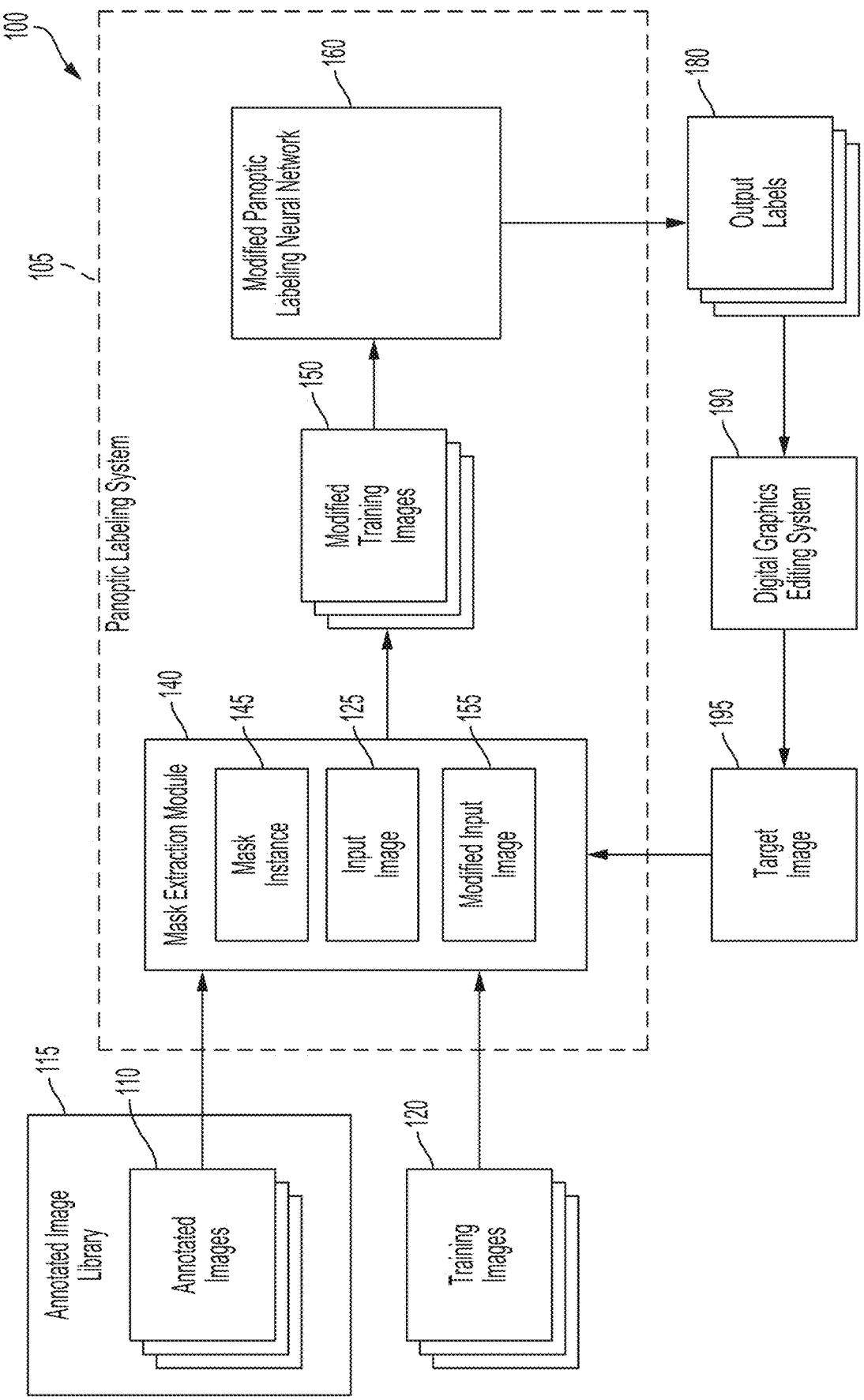
FIG. 1 is a diagram depicting an example of a computing environment in which labels are generated for pixels in a digital graphical image, according to certain embodiments.

As discussed above, prior techniques for providing segmentation data do not include a modified panoptic labeling neural network that is trained based on comparable infill shapes. Certain embodiments described herein provide for a modified panoptic labeling neural network ("modified PLNN") that is capable of generating labels for objects present in an input image. In some implementations, the input image may be modified to include a mask, such as a mask indicating an area to be infilled. In addition, the modified PLNN may be configured to receive the modified input image via at least one color channel and at least one mask channel. The channels describe, for example, color data of the input image or mask data indicating a location of the mask. The modified PLNN generates labels for the modified input image.

The following examples are provided to introduce certain embodiments of the present disclosure. A panoptic labeling system includes a mask extraction module and a modified PLNN. During an application phase, the panoptic labeling system is applied to an input image and a mask instance describing an object depicted in the input image. The mask instance can indicate the object to be infilled. For example, the infill object might be erased from the image, have an adjusted position within the image, or have another suitable operation performed that includes modifying pixels from the initial position of the infill object. As a non-limiting example, the panoptic labeling system could receive an input image depicting a bird sitting on a tree branch, where the bird is to be infilled (e.g., removed from the image or otherwise modified). For this example input image, the mask instance can indicate the bird as the infill object. In some cases, the mask extraction module of the panoptic labeling system may extract the mask instance for the infill object. Additionally or alternatively, the input image may indicate pixels that are included in one or more of the mask instance or the infill object.

The panoptic labeling system generates a modified input image based on the input image and the mask instance (or pixels otherwise indicated for infill). For the example image, the modified input image could include the image of the bird and also the mask instance indicating the bird as the infill. In addition, the panoptic labeling system determines a set of labels describing objects depicting in a group of training images and a subset of the set of labels describing objects depicting in the modified training image. Each label in the label set can represent a category of an object that is depicted in one or more of the training images. Each label in the label subset can represent a category of an object that is depicted in the modified input image. For example, if the panoptic labeling system is trained based on a group of training images depicting animals, the set of labels can represent categories for objects such as "bird," "dog," "tree," "branch," "water," or other objects depicted in the training images. For the example bird image, the subset of labels could include "bird," "tree," "branch," or other labels for objects in the example image.

In the panoptic labeling system, the modified PLNN can receive the modified input image via at least one color channel and at least one mask channel. The modified PLNN generates mask labels for mask pixels included in the mask instance of the modified input image. For each mask pixel, the mask label is based on distances between the mask pixel and object pixels of other objects in the modified input image, and are also based on probabilities of the mask pixel having labels from the subset. In the example bird image, the mask labels indicate one or more objects that could infill the bird shape indicated by the mask instance. For instance, a distance could be determined between each mask pixel in the bird shape and a closest object pixel for each label in the subset, such as a first distance to the closest object pixel labeled "tree," a second distance to the closest object pixel labeled "branch," and additional distances for each other label in the subset. In addition, the modified PLNN can determine a probability that the mask pixel in the bird shape has the label of the object pixel, based on the distance between the mask pixel and the object pixel and on the set of labels representing objects depicted in the training images. For each mask pixel, the modified PLNN can determine a first probability that the mask pixel has the subset label "tree," an additional probability that the mask pixel has the subset label "branch," and additional probabilities for each other label in the subset. Based on the probabilities, the modified PLNN can generate the mask label for each mask pixel. The mask labels can be provided to an additional computing system, such as to a digital graphics editing system, In some cases, the modified PLNN is trained to determine the probabilities based on the group of training images. During a training phase, the panoptic labeling system receives the group of training images. The mask extraction module determines an object depicted in a training image. The mask extraction module also determines, from a library of annotated images, an annotated image that depicts a comparable object that is similar to the object in the training image. The comparable object can be determined based on a comparison of feature vectors of the training image and the annotated images in the library. For instance, if a particular training image depicts a giraffe drinking from a fountain, the mask extraction module may determine annotated images that also depict giraffes. The mask extraction module extracts a mask instance representing the comparable object. In addition, the mask extraction module creates a modified training image, including a combination of the training image and the mask instance. For the particular training image of a giraffe, the mask extraction module could create a modified training image that depicts the giraffe drinking from the fountain, and also depicts a mask instance of an additional giraffe, extracted from an annotated image that depicts comparable giraffes.

In some implementations, the mask extraction module may create multiple modified training images based on multiple training images and respective mask instances. Each of the mask instances represents a respective comparable object that is similar to an object in the respective one of the training images. The modified PLNN can generate a set of labels indicating objects depicted in the multiple modified training images. Additionally or alternatively, the modified PLNN can generate a subset of the labels for each modified training image, a particular subset indicating the objects included in a particular modified training image. Based on the multiple modified training images, the modified PLNN may be trained to generate mask labels for mask pixels in the mask instance of each modified training image. For a particular mask pixel, the mask label can be based on a distance between the mask pixel and an object pixel that has a label from the subset of labels for the modified training image. In addition, the modified PLNN may verify the mask labels via a multi-term loss function, such as a loss function with multiple terms based on one or more of the set of labels and the subset of the labels. In some cases, the modified PLNN is trained based on the verified mask labels, and mask labels for an input image (e.g., the example bird image described above) can be determined by the trained modified PLNN.

The mask labels may indicate, from the modified training image, an additional object that has a relatively high probability of including the labeled pixel. For the example training image of the giraffe, the modified PLNN may determine mask labels for pixels that correspond to the mask instance of the additional giraffe. The mask labels can be based on a distance between mask pixels and object pixels of other labeled objects of the example image, such as object pixels labeled as "water" or "tree" from the subset of labels for the example image. The mask labels for the example image may be verified against the image's pixel content that is underneath the mask instance (e.g., in pixel locations corresponding to pixels of the mask). The verification can be based on a multi-term loss function, with terms based on the subset of the labels for the example giraffe image, and on the set of labels for the multiple modified training images.

As used herein, the term "image" refers to a digital image depicting a graphical representation of subject matter. For example, an image can use pixels to represent a depiction of one or more objects. In some embodiments, the image is included in a collection of images, such as a library of images. In some cases, an image could depict objects that can have countable instances, such as a quantity of people. In addition, the image could depict objects that do not have countable instances, such as sky, water, ground, or other objects that typically do not have a quantity. For convenience, and not by way of limitation, objects that can have countable instances can be referred to as "things" (e.g., countable things), and objects that do not have countable instances can be referred to as "stuff" (e.g., non-countable stuff).

As used herein, the term "segmentation" refers to analysis of an image to determine relations between areas of the image. As used herein, the term "panoptic segmentation" refers to segmentation analysis of an image that is based on a combination of semantic segmentation and instance segmentation. In some cases, segmentation, including panoptic segmentation, is based on content depicted in the image. For example, semantic segmentation of the image can indicate contextual relations between areas of image content, such as an indication that multiple blue areas near the top of the image represent sky. Additionally or alternatively, instance segmentation of the image can indicate distinctive relations between areas of image content, such as an indication that a first human figure and a second human figure represent different people. In some cases, segmentation analysis produces segmentation data, such as labels for pixels in the image.

In some implementations, a panoptic labeling system can perform panoptic segmentation of an image. The panoptic segmentation can include one or both of semantic segmentation or instance segmentation. For example, the panoptic labeling system can perform panoptic segmentation that includes semantic segmentation of non-countable objects, such as semantic segmentation of water, ground, sky, or other non-countable stuff depicted in the image. Additionally or alternatively, the panoptic labeling system can perform panoptic segmentation that includes instance segmentation of countable objects, such as instance segmentation of people, animals, vehicles, or other countable things depicted in the image. In some cases, labels generated by the panoptic labeling system can include labels for one or more of non-countable stuff or countable things, such as labels for objects determined via semantic segmentation or labels for objects determined via instance segmentation.

As used herein, the term "neural network" refers to refers to one or more computer-implemented networks capable of being trained to achieve a goal. Unless otherwise indicated, references herein to a neural network include one neural network or multiple interrelated neural networks. For example, a neural network includes one or more subnetworks or components, and a subnetwork may also include one or more subnetworks or components. In some cases, one or more neural networks are trained together. Examples of neural networks include, without limitation, convolutional neural networks, residual neural network, feature pyramid neural networks, or other types of neural networks that are capable of performing tasks related to panoptic labeling.

As used herein, the term "label" refers to data indicating a category to which a pixel belongs. For example, a label can indicate one or more of an object category to which a respective pixel belongs, or an object instance in which the pixel is included. In some implementations, a label for a pixel could indicate that the pixel is included in a countable object, such as an object having instances, and could also indicate which particular instance of the countable object includes the pixel. In addition, label could indicate that the pixel is included in a non-countable object, such as an object that does not have instances. A label can be represented by text data, binary data, a database record, or any other suitable format or data structure, including formats or data structures not intended for human interpretation.

As used herein, the terms "mask" and "mask instance" refer to a representation of an object depicted in an image. For example, a mask instance describes the object's location (e.g., position, size, shape) in the image. In some embodiments, a mask instance is a digital graphical image, such as a black-and-white image comprising pixels. For example, the mask instance could include white (or black) pixels indicating the location of the object in the image, and black (or white) pixels indicating other areas of the image (e.g., where the object is not located). In some cases, a mask instance can be represented by numeric data, such as a value of 1 (or 0) for a pixel indicating the location of the object in the image, and a value of 0 (or 1) for a pixel indicating another area of the image.

Referring now to the drawings, FIG. 1 is a diagram depicting an example of a computing environment 100 in which labels are generated for pixels in a digital graphical image. The environment 100 includes a panoptic labeling system 105, a digital graphics editing system 190, and a library 115 of annotated images. In some embodiments, the panoptic labeling system 105 includes a modified PLNN 160 and a mask extraction module 140. In some cases, one or more components in the environment 100 can communicate via a computing network. For example, the mask extraction module 140 can communicate with the modified PLNN 160 via a network. Additionally or alternatively, the panoptic labeling system 105 may communicate, via a network, with one or more of the annotated image library 115, the digital graphics editing system 190, or any other suitable computing system. The panoptic labeling system 105 can receive images, such as a digital graphical image depicting a graphical representation of subject matter. For example, an image uses pixels or vector-based graphics to represent a depiction of a human. In some cases, the image is a stand-alone image, such as a photograph, drawing, or scanned document. Additionally or alternatively, the image is included in a collection of images, such as a frame within an existing video or a page in a collection of document images.

In FIG. 1, the panoptic labeling system 105 is configured to receive one or more images during a training phase, such as a group of annotated images 110 or a group of training images 120. For instance, the panoptic labeling system 105 receives the annotated images 110 from the annotated image library 115. The annotated images 110 include one or more digital graphical images that are associated with respective annotations that indicate content of the associated image. For example, each one of the annotated images 110 depicts content, such as images depicting people, animals, landscapes, or other types of content. Additionally or alternatively, each one of the annotated images 110 is associated with annotations that indicate a category of objects included in the depicted content. In some cases, annotations for a particular annotated image include (or otherwise represent), for each pixel in the annotated image, a label indicating a category of the object that includes the pixel. As a non-limiting example, a particular annotated image depicts several people walking on a sidewalk, a dog walking on the sidewalk, and a parked car. The annotations associated with the example annotated image indicate categories of "person" (e.g., for pixels included in the depicted people), "dog" (e.g., pixels included in the dog), "vehicle" (e.g., pixels included in the parked car), and "pavement" (e.g., pixels included in the sidewalk). The annotations are stored, for example, as text, an array, a database record, or via another suitable data structure that can be associated with the respective image. In some cases, annotations for a particular annotated image indicate the ground-truth labels for some or all pixels included in the particular annotated image.

Additionally or alternatively, the panoptic labeling system 105 receives the training images 120 during the training phase. In some implementations, the training images 120 are received from the annotated image library 115. Additionally or alternatively, the training images 120 are received from an additional computing system, such as a database that includes a training corpus of images. The training images 120 depict content that includes object instances or multiple instances in categories. In some implementations, the training images 120 are not identical to the annotated images 110. For example, images in the training images 120 are excluded from the annotated images 110, and images in the annotated images 110 are excluded from the training images 120. In some cases, the training images 120 include annotations, including annotations that indicate a category of the content depicted in the training images 120. In some cases, annotations for a particular training image indicate the ground-truth labels for some or all pixels included in the particular training image.

In some implementations, the panoptic labeling system 105 is configured to receive images, such as a target image 195, during an application phase. For instance, the panoptic labeling system 105 receives the target image 195 from the digital graphics editing system 190. As a non-limiting example, the digital graphics editing system 190 could provide the target image 195 in response to receiving an indication of an infill operation. For example, the digital graphics editing system 190 could receive the indication from a user via one or more user interface components, and determine based on the indication that the user has selected at least a portion of the target image 195 for modification via the infill operation.

In some implementations, the mask extraction module 140 receives an input image 125 based on the one or more images received during the training phase or during the application phase. For example, during the application phase, the mask extraction module 140 receives the input image 125 based on the target image 195, such as by selecting the target image 195. Additionally or alternatively, during the training phase, the mask extraction module 140 receives the input image 125 based on the training images 120, such as by selecting a particular one of the training images. In some cases, the mask extraction module 140 receives multiple input images based on the training images 120. For instance, the mask extraction module 140 can be configured to perform one or more techniques for each image included in the training images 120.

During a training phase of the environment 100, the mask extraction module 140 receives the input image 125 based on the training images 120. Additionally or alternatively, the mask extraction module 140 determines a mask instance 145 for the input image 125. In some cases, the mask instance 145 is determined based on a similarity between the input image 125 and one or more of the annotated images 110. For example, the mask extraction module 140 determines a feature vector of the input image 125, such as via a feature-extraction neural network. Additionally or alternatively, the mask extraction module 140 determines an additional feature vector of one or more respective images in the annotated images 110. An extracted feature can refer to a graphical quality of an image, such as the input image 125. Features can describe fundamental qualities representing technical graphical aspects of the image, such as brightness, contrast, color, directional edges (e.g., vertical, horizontal, diagonal edges), textures depicted in the image, image resolution, or other suitable technical aspects. Additionally or alternatively, the image can include features describing contextual qualities representing graphical content of the image, such as semantic features. A semantic feature can describe the meaningful content of an image, such as image content representing a human figure, an object held by the human figure, an action occurring in the image, an emotion apparent in the image, background objects or figures, or other types of image content. In some cases, features include non-graphical representations of graphical qualities, such as a mathematical gradient based on lighting depicted in the image, or a data structure including an indication of whether the image includes a type of semantic content, such as a human figure.

In FIG. 1, the mask extraction module 140 compares the feature vector of the input image 125 to each of the additional feature vectors of the annotated images 110. Based on the comparison, the mask extraction module 140 determines a subgroup of one or more particular images of the annotated images 110. In some cases, the particular annotated images in the subgroup depict content similar to the content of the input image 125. For example, the feature vector of the input images 125 and the additional feature vectors of the particular annotated images could have values that are within a threshold of similarity. As a non-limiting example, if the input image 125 depicts people walking on a sidewalk, the mask extraction module 140 determines a subgroup of one or more annotated images that depict people walking on sidewalks, responsive to determining that the feature vectors of the input image 125 and the subgroup of annotated images are within the similarity threshold.

In some implementations, during the training phase, the mask extraction module 140 extracts the mask instance 145 from the subgroup of annotated images that depict content similar to the content of the input image 125. Continuing with the above example, the mask extraction module 140 may extract, from one of the subgroup of annotated images, a mask that indicates one of the instances of depicted people. As used herein, a mask or a mask instance can include data that represents one or more particular areas of an image, such as an area of contiguous pixels. A mask can indicate a group of pixels that are included in a particular image area, such as with white color data (or other suitable data) to indicate pixels in the particular area or black color data (or other suitable data) to indicate pixels omitted from the particular area.

Additionally or alternatively, the mask extraction module 140 generates a modified input image 155 based on the mask instance 145 and the input image 125. For example, the mask extraction module 140 modifies the input image 125 (or otherwise generates the modified input image 155) to include the mask instance 145. In some cases, the modified input image 155 includes at least one channel representing pixel data from the input image 125, such as one or more channels indicating red-green-blue ("RGB") color data of the pixels. Additionally or alternatively, the modified input image 155 includes at least one channel representing pixel data from the mask instance 145, such as one or more channels indicating a presence of a mask pixel at a particular location of the image 155. Mask data that indicates the presence of the mask pixel could include, for example, color data (e.g., white and/or black pixels), Boolean data (e.g., 1 and/or 0), or any other suitable data to represent presence or absence of mask pixels at locations in the image. In some implementations, i.e., when the input image 125 is based on one of the training images 120, the modified input image 155 can include annotations of the input image 125, such as ground-truth labels indicating categories of pixels of the input image 125.

During the training phase, the mask extraction module 140 extracts a respective mask instance from the annotated images 110 for each of the training images 120 (e.g., based on a comparison of the feature vector for each training image). Additionally or alternatively, the mask extraction module 140 generates a group of modified training images 150 based on each of the training images 120 and the respective mask instance. In some cases, some or all of the modified training images 150 include respective annotations indicating ground-truth labels for pixels in the respective modified image.

In the panoptic labeling system 105, the modified PLNN 160 receives one or more of the modified input images 155 or the modified training images 150. During the training phase, the modified PLNN 160 trains based on the modified training images 150. For example, for each respective modified training image, based on the at least one channel representing color data and the at least one channel representing mask data, the modified PLNN 160 trains to label pixels included in the mask for the respective image. For each respective modified training image, the labeled pixels have locations in the respective image which correspond to locations in the respective mask instance. For example, based on the at least one channel representing color data and the at least one channel representing mask data, the modified PLNN 160 labels each pixel that has a location corresponding to a mask pixel in the respective mask instance. In some cases, the labels generated by the modified PLNN 160 indicate an object category to which the mask pixel belongs. Additionally or alternatively, the modified PLNN 160 verifies the training, such as by determining a multi-term loss based on the generated label and the ground-truth label for a particular pixel of the respective image.

During an application phase of the environment 100, the mask extraction module 140 receives the input image 125 based on the target image 195. Additionally or alternatively, the mask extraction module 140 determines a mask instance 145 for the input image 125. In some cases, the mask instance 145 is determined based on an indication of an object instance that is the target of an infill operation. For example, the mask extraction module 140 receives, from the digital graphics editing system 190, an indication of an object depicted in the target image 195 that is to be infilled. The infill operation indicates, for example, that some or all depicting the object are modified to depict background content (e.g., content that is semantically understood as being behind the object). In some cases, the indicated object is replaced via the infill operation, such as by modifying all (or nearly all) pixels in the object to have the appearance of the background content. Additionally or alternatively, the indicated object is adjusted via the infill operation, such as by modifying a portion of pixels depicting the object, to have the appearance of the background content. A non-limiting example of an adjustment infill is a positional adjustment, such as modifying the object to appear in a different location (e.g., lateral adjustment), to have a different orientation (e.g., rotation adjustment), or to have a different size (e.g., scaling adjustment).

During the application phase, the mask extraction module 140 generates the modified input image 155 based on the mask instance 145 and the input image 125. For example, the mask extraction module 140 modifies the input image 125 (or otherwise generates the modified input image 155) to include the mask instance 145. In some cases, the modified input image 155 includes at least one channel representing pixel data from the input image 125, such as one or more channels indicating red-green-blue ("RGB") color data of the pixels. Additionally or alternatively, the modified input image 155 includes at least one channel representing pixel data from the mask instance 145, such as one or more channels indicating a presence of a mask pixel at a particular location of the image 155. In some implementations, i.e., when the input image 125 is based on the target image 195, the modified input image 155 can omit annotations of the input image 125, such as if the target image 195 does not include known ground-truth labels.

In the panoptic labeling system 105, the modified PLNN 160 receives one or more of the modified input image 155, or the modified training images 150. During the application phase, the modified PLNN 160 generates labels for pixels that are included in modified input image 155. The labeled pixels have, for example, locations in the modified input image 155 which correspond to locations in the mask instance 145. For example, based on the at least one channel representing color data and the at least one channel representing mask data, the modified PLNN 160 labels each pixel that has a location corresponding to a mask pixel in the mask instance 145. In some cases, the labels generated by the modified PLNN 160 indicate an object category to which the pixel belongs. In some cases, during the application phase, the modified PLNN 160 does not verify the labeled pixels, for example, by omitting operations related to determining a multi-term loss based on a generated label and a ground-truth label.

In FIG. 1, the modified PLNN 160 generates output labels 180 based on one or more of the modified input image 155 or the modified training images 150. In some cases, such as if the output labels 180 are generated during the training phase, the modified PLNN 160 verifies the output labels 180, such as by determining the multi-term loss between the generated and ground-truth labels for each particular pixel. Additionally or alternatively, such as if the output labels 180 are generated during the application phase, the modified PLNN 160 provides the output labels 180 as an output of the panoptic labeling system 105. In some implementations, an additional computing system, such as the digital graphics editing system 190, receives the output labels 180. For example, the digital graphics editing system 190 could use the output labels 180 to complete an infill operation for modifying the target image 195.

Figure 2:
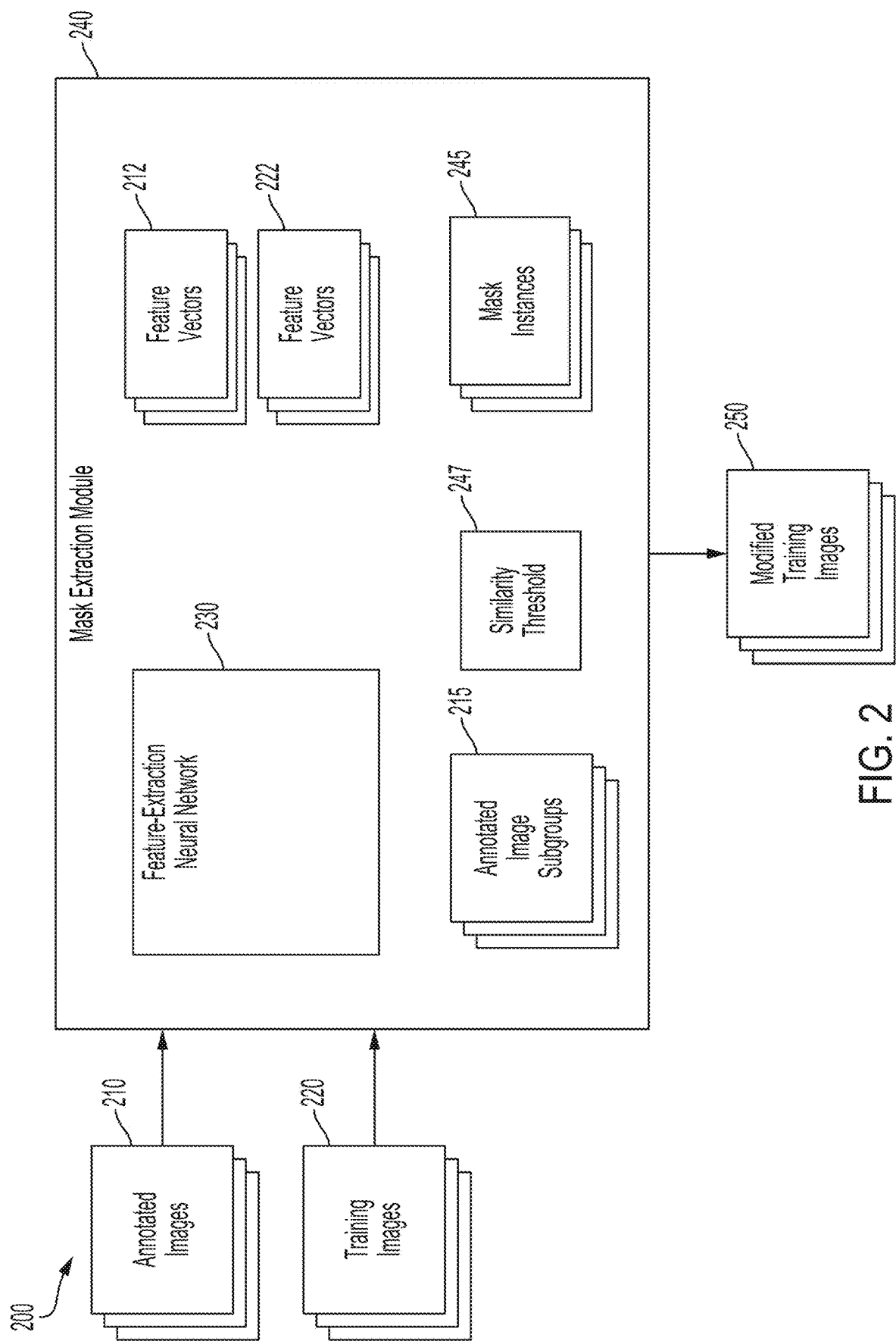
FIG. 2 is a diagram depicting an example of a mask extraction module configured to generate modified images from combinations of input images and mask instances, according to certain embodiments.
Figure 3:
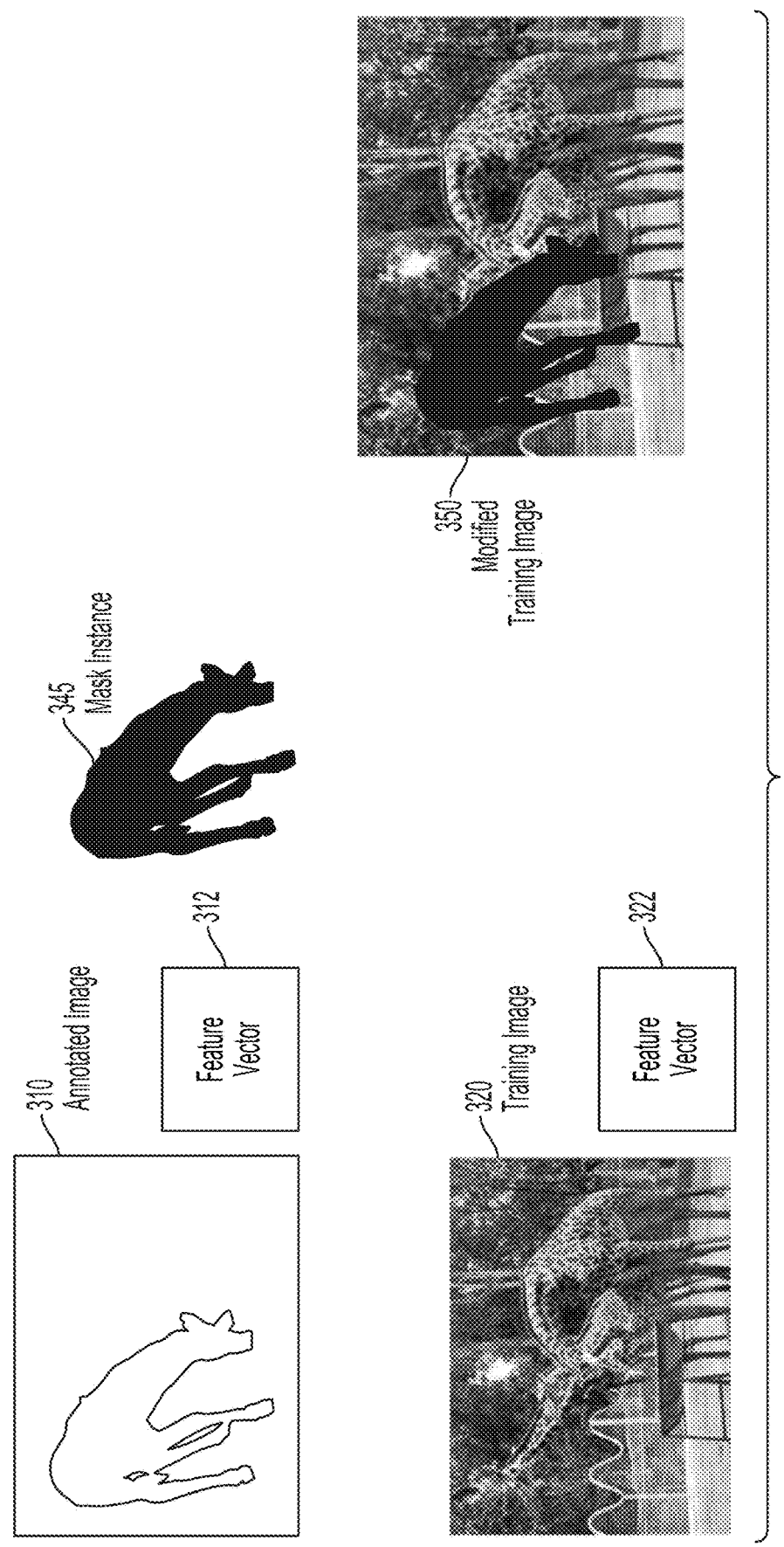
FIG. 3 is a diagram depicting examples of images or data structures that are received or generated by a mask extraction module, according to certain embodiments.

FIG. 2 is a diagram depicting an example of a computing environment 200 in which a mask extraction module 240 generates one or more modified images from one or more input images. Certain aspects of FIG. 2 may be better understood in regards to FIG. 3, which depicts diagrammatic examples of particular images or other data structures that are received or generated by the mask extraction module 240 of the computing environment 200. In some cases, the mask extraction module 240 is included in (or otherwise in communication with) a panoptic labeling system, such as the panoptic labeling system 105. For convenience, and not by way of limitation, techniques described with regard to FIGS. 2 and 3 are described in relation to a training phase of the computing environment 200 of FIG. 2, except where otherwise noted. However, some portions of the described techniques may be related to an application phase. For example, in FIG. 2, the mask extraction module 240 is described as receiving a group of training images 220 and generating a group of modified training images 250, such as during a training phase of the panoptic labeling system. However, other implementations are possible, such as the mask extraction module 240 generating a modified input image during an application phase. For example, the mask extraction module 240 could generate a modified input image based on an input image received from an additional computing system, such as the target image 195 received from the digital graphics editing system 190.

In some implementations, the mask extraction module 240 receives a group of one or more annotated images 210. The annotated image group 210 includes, as a non-limiting example, a particular annotated image 310 that depicts a giraffe drinking from a body of water in a natural landscape. Additionally or alternatively, the mask extraction module 240 receives the training image group 220. The training image group 220 includes, as a non-limiting example, a particular training image 320 that depicts a group of giraffes, one of which is drinking from a water fountain, in a fenced enclosure. The annotated image group 210 is received, for example, from a library of annotated images, such as the annotated image library 115. In some cases, the training image group 220 is stored, or otherwise associated with, a panoptic labeling system that includes the mask extraction module 240. Additionally or alternatively, the training image group 220 is received from another computing system. Each annotated image of the annotated image group 210 and each training image in the training image group 220 includes data describing a digital graphical image that comprises pixels (e.g., an image in a .jpeg, .gif, or bitmap file format). In some cases, the pixels in a particular image indicate color data, such as RGB, hue, luminescence, chroma, or other suitable types of color data. The digital graphical image data describes content depicted by the respective image. For example, the example images 310 and 320 each include respective pixels that represent the respective content (e.g., giraffes, water sources, landscape) of the images 310 and 320.

In some cases, one or more annotated images from the annotated image group 210 includes, or is otherwise associated with, annotations of the respective annotated image. Additionally or alternatively, one or more training images from the training image group 220 includes, or is otherwise associated with, annotations of the respective training image. The annotations for each image from the groups 210 or 220 could be stored in a data structure associated with the respective image, such as an array (or other data structure) of labels corresponding to pixels in the respective image.

The annotations of the annotated image group 210 or the training image group 220 indicate, for instance, a category of one or more objects included in the depicted image content. In some cases, annotations for a particular annotated or training image indicate labels, such as ground-truth labels, for some or all pixels included in the particular annotated or training image. For example, annotations can include labels of one or more pixels included in a particular image. The label of a given pixel in the particular image indicates an object category to which the given pixel belongs. In some cases, the object category is assigned based on content depicted by the particular image. For example, annotations of the annotated image 310 could include pixel labels indicating object categories of "giraffe," "water," "grass," "tree," or other categories of objects depicted in image 310. Annotations of the training image 320 could include pixel labels indicating object categories of "giraffe," "fountain," "fence," "tree," "ground," or other categories of objects depicted in image 320.

In the example of FIGS. 2 and 3, the mask extraction module 240 generates (or otherwise receives) a group of feature vectors 212 associated with the group of annotated images 210. For example, the mask extraction module 240 generates the feature vectors 212 by extracting, for one or more of the annotated images included in the annotated image group 210, a respective feature vector. As a non-limiting example, the feature vectors 212 include a feature vector 312 that is associated with the annotated image 310. Additionally or alternatively, the mask extraction module 240 generates (or otherwise receives) a group of feature vectors 222 associated with the group of training images 220. For example, the mask extraction module 240 generates the feature vectors 222 by extracting, for one or more of the training images included in the training image group 210, a respective feature vector. As a non-limiting example, the feature vectors 222 include a feature vector 322 that is associated with the training image 320. In some cases, the mask extraction module 240 generates the feature vectors 212 and the feature vectors 222 during a training phase. In the environment 200, each one of the feature vectors 212 is associated with a respective annotated image from of the annotated image group 210. Additionally or alternatively, each one of the feature vectors 222 is associated with a respective training image from the training image group 220.

In some implementations, one or more of the feature vectors 212 or the feature vectors 222 are generated via one or more neural networks, such as a feature-extraction neural network 230. Non-limiting examples of a feature-extraction neural network include a convolutional neural network (e.g., VGG16), a residual neural network (e.g., ResNet), or other types of neural networks that are capable of determining features of one or more digital graphical images. In some cases, an image is resized, cropped, or both prior to being provided to the feature-extraction neural network 230. For example, one or more images from the annotated image group 210 or training image group 220 is resized to 256×256. Additionally or alternatively, one or more images from the annotated image group 210 or training image group 220 is cropped (e.g., based on a center of an image, based on subject matter of an image) to 224×224. FIG. 2 depicts the feature-extraction neural network 230 as being included in the mask extraction module 240, but other implementations are possible. For example, the mask extraction module 240 could receive a group of feature vectors, or otherwise communicate with a feature-extraction neural network, via one or more computing networks.

For a particular annotated image or training image, the feature-extraction neural network 230 determines features that represent graphical characteristics of the particular image. The features represent, for example, technical graphical aspects, such as brightness, contrast, color, directional edges (e.g., vertical, horizontal, diagonal), image resolution, or other technical aspects. Additionally or alternatively, the features represent semantic characteristics that indicate meaningful content of the particular image, such as semantic characteristics that indicate depicted objects (e.g., human figures, animals, vehicles, landscape), semantic characteristics that indicate behavior (e.g., movement of objects, objects at rest, interactions between objects), or other semantic characteristics that indicate meaning conveyed by the particular image. Based on the extracted features of the particular image, the feature-extraction neural network 230 may generate a feature vector that is associated with the particular image. For example, the feature vector includes data (e.g., numbers, data structures) that represent the features extracted from the particular image. As a non-limiting example, the feature vector 312 could include data indicating that the annotated image 310 includes a giraffe as primary content, natural landscape as secondary content, offset content (e.g., the depicted giraffe is not centered in the image), bending behavior (e.g., the depicted giraffe is bending to reach water), or other characteristics of the image 310. As an additional non-limiting example, the feature vector 322 could include data indicating that the training image 320 includes multiple giraffes as primary content, a combination of natural/artificial landscape as secondary content, centered content, bending behavior, or other characteristics of the image 320.

For each particular training image of the training image group 220, the mask extraction module 240 determines one or more annotated images from the annotated image group 210 that are similar to the particular training image. In some implementations, the image similarity is based on a similarity of feature vectors associated with the images, such as by determining a cosine distance between feature vectors. For example, the mask extraction module 240 determines a cosine distance between the feature vector 322, for training image 310, and each of the feature vectors 212. In FIGS. 2 and 3, the mask extraction module 240 determines similarity based on a cosine distance between feature vectors, but other measurements of similarity may be used, based on other metrics or values.

Based on the determined similarities of the respective feature vectors, the mask extraction module 240 generates one or more subgroups 215 of the annotated images. For example, each one of the annotated image subgroups 215 is associated with a particular training image of the training image group 220. Each respective subgroup includes, or otherwise indicates, one or more annotated images (e.g., of the group 210) that are similar to the particular training image. For instance, the respective subgroup associated with the training image 320 can include one or more annotated images having characteristics (e.g., represented by a feature vector) similar to the characteristics of the training image, such as the example characteristics of multiple giraffes as primary content, combined natural/artificial landscape as secondary content, centered content, or bending behavior.

In some implementations, the mask extraction module 240 generates the subgroups 215 based on a similarity threshold 247. For example, the similarity threshold 247 can indicate a value for the cosine distance, such that a particular subgroup includes annotated images with feature vectors that fulfill the value of the similarity threshold 247 (e.g., the cosine distance between the feature vectors is less than the value, or has another suitable relationship to the value). Additionally or alternatively, the similarity threshold 247 can indicate a quantity of annotated images, such that the particular subgroup includes the quantity of annotated images having feature vectors most similar (e.g., a shortest cosine distance) to the feature vector of the subgroup's training image. For instance, the respective subgroup associated with the training image 320 can include the annotated image 310, responsive to determining that the feature vector 312 fulfills the similarity threshold 247 with respect to the feature vector 322 (e.g., the cosine distance between the feature vectors 312 and 322 is within the threshold 247).

In some implementations, the mask extraction module 240 determines a respective mask instance for one or more training images included in the training image group 220. For instance, a group of mask instances 245 includes, for each training images of the group 220, a respective mask instance associated with a respective training image. In some cases, the mask instances 245 are selected based on the annotated image subgroups 215. For the example training image 320, the mask extraction module 240 extracts a mask instance 345 of an object that is depicted in the annotated image 310, based on the annotated image 310 being included in the subgroup associated with training image 320. In some cases, the mask instance is selected from an annotated image that is most similar (e.g., having a shortest cosine distance) to the particular training image. Additionally or alternatively, the mask instance is randomly or pseudo-randomly selected from the annotated image subgroup associated with the particular training image. For each particular training image, the respective mask instance can represent an object that is similar, or depicts similar content, to objects depicted in the particular training image. Continuing with the example training image 320, the mask instance 345 represents another giraffe depicted by an image in the respective annotated image subgroup, such as the drinking giraffe depicted in annotated image 310.

Based on the training image group 220 and the mask instances 245, the mask extraction module 240 generates one or more modified training images 250. Each one of the modified training images 250 includes one or more channels representing a particular training image and the respective mask instance associated with the particular training image. For example, the mask extraction module 240 generates a modified training image 350 that is included in the group of modified training images 250. The modified training image 350 is generated based on the training image 320 and the associated mask instance 345. Additionally or alternatively, the modified training image 350 includes at least one channel that represents color data from pixels included in the training image 320, such as one or more of a first channel representing red color data, a second channel representing green color data, or a third channel representing blue color data. Additionally or alternatively, the modified training image 350 includes at least one channel that represents mask data from pixels included in the mask instance 345, such as a fourth channel representing whether a particular pixel or pixel location is or is not included in the mask instance 345. Although FIG. 3 depicts the modified training image 350 as a digital graphical image, other implementations are possible. For example, a modified training image could comprise a data structure other than an image file, such as an array, a database record, a list of concatenated values (e.g., representing pixel values of one or more channels), or other suitable data structures, including data structures not intended for human interpretation.

In some implementations, a particular modified training image is generated based on an adjustment of the respective mask instance, with respect to the location of the mask's represented object in the annotated image from which the mask was extracted. For example, the respective mask instance could be translated (e.g., moved horizontally and/or vertically), rotated, scaled or have another type of adjustment made, such that the location of the respective mask instance with respect to the modified training image is different from the mask's location with respect to the annotated image. In some cases, if the particular modified training image is generated based on an adjustment of the respective mask instance, the channel representing the mask data indicates the adjusted location of the respective mask instance.

In some cases, a particular modified training image can include annotations for the associated training image, such as annotations indicating ground-truth labels for some or all pixels included in the associated training image. For instance, the modified training image 350 includes ground-truth labels for each pixel in the training image 320. For the modified training image 350, each ground-truth label indicates an object category for a respective pixel, such as whether the pixel is included in a "giraffe" object, a "fountain" object, a "ground" object, or other example categories of objects depicted in image 320. In some cases, a label indicates one or more of a category of an object or an instance of an object. For example, annotation data for the training image 320 can indicate labels for a first pixel included in a first giraffe depicted by the image 320, a second pixel included in a second depicted giraffe, and a third pixel included in a third depicted giraffe. Respective labels for the first, second, and third pixels can indicate a category "giraffe" for the respective objects to which the pixels belong. Additionally or alternatively, the respective labels can indicate an instance of the respective objects. For example, the first pixel could have a label of <Giraffe, 1> indicating that the first pixel belongs to a first object instance having the category "giraffe." The second pixel could have a label of <Giraffe, 2> indicating that the second pixel belongs to a second object instance having the category, and the third pixel could have a label of <Giraffe, 3> indicating that the third pixel belongs to a third object instance having the category. The example labels are presented here as text for convenience, not by way of limitation, and labels may be represented by other formats or data structures, including formats or data structures not intended for human interpretation.

In some implementations, one or more modified training images are provided to a modified PLNN. During a training phase, the modified PLNN can train, based on the modified training images, to generate labels for pixels that are included in mask instances of the modified training images. In some cases, the generated labels are infill labels that indicate an additional object in the modified training image to which the pixel is likely to belong. The additional object could be an object other than the mask instance, such as a background object or an object that is semantically understood to be behind the mask instance. In some cases, the modified PLNN verifies the generated labels. For example, a generated infill label for a pixel at a particular location in the mask instance is verified against a ground-truth label for a pixel at the same particular location in the image content. In some cases, a modified PLNN that is trained based on modified training images that include mask instances from other images (e.g., similar images) can label pixels with higher accuracy. For example, training based on a mask instance included in a modified training image can improve accuracy of labeling pixels in a shape (e.g., the mask) that resembles other objects depicted in the image.

Figure 4:
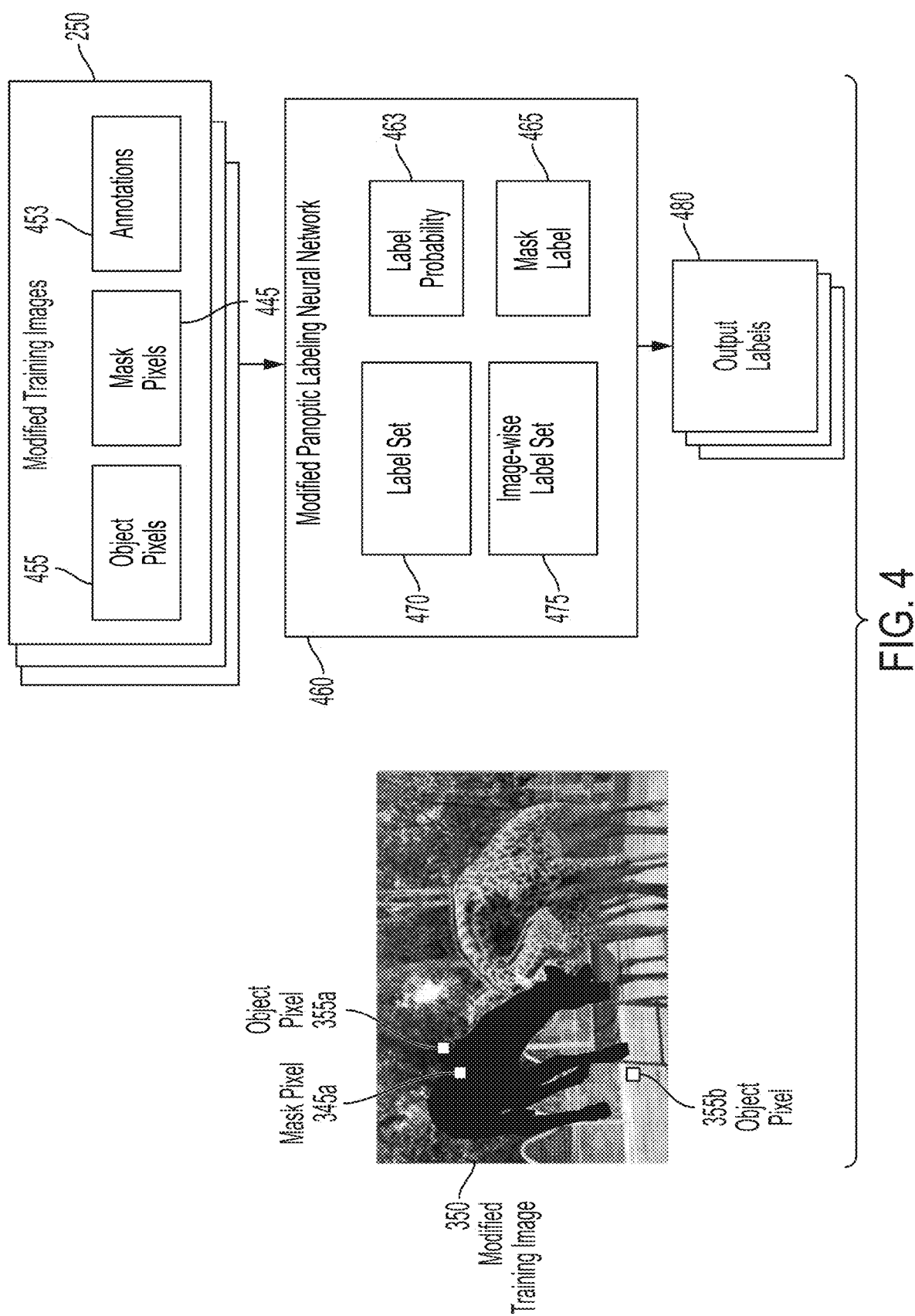
FIG. 4 is a diagram depicting an example of a modified panoptic labeling neural network that is configured to generate or verify labels for pixels, according to certain embodiments.

FIG. 4 depicts an example of a modified PLNN 460 that is configured to train, such as during a training phase, for one or more of generating labels for pixels or verifying labels for pixels. Additionally or alternatively, the modified PLNN 460 is configured to generate labels for pixels without verifying the generated labels, such as during an application phase. In some implementations, the modified PLNN 460 is included in the computing environment 200 and is capable of receiving the modified training images 250 from the mask extraction module 240. In addition, other implementations are possible, such as the modified PLNN 460 being configured to receive modified training images or input images from an additional computing system, e.g., via a computer communications network. For convenience, and not by way of limitation, techniques described in regard to FIG. 4 are described in relation to a training phase, except where otherwise noted. However, some portions of the described techniques may be related to an application phase.

In FIG. 4, each particular one of the modified training images 250 includes, or otherwise represents, a group of pixels, such as object pixels 455, that are associated with respective image content represented by the particular modified training image. For example, the object pixels 455 could depict (or otherwise represent) the content of the training image from which the particular modified training image is modified. In the example modified training image 350, the respective group of object pixels depicts multiple giraffes in a fenced enclosure, as described in regard to FIG. 3. Additionally or alternatively, each particular one of the modified training images 250 includes, or otherwise represents, a group of mask pixels, such as mask pixels 445, that are associated with the respective mask instance for the particular modified training image. The mask pixels 445 have respective locations relative to the object pixels 455. For instance, each particular one of the mask pixels 445 could have a location identical or similar to a respective location of a respective one of the object pixels 455. In the example modified training image 350, the mask pixels of the mask instance 345 could be co-located with a portion of the object pixels depicting the giraffes. For convenience, and not by way of limitation, the mask instance 345 could be interpreted as covering the depicted content, such as where a mask pixel is co-located with an object pixel.

In some cases, each particular one of the modified training images 250 includes annotations, such as annotations 453, that indicate labels of the object pixels 455 for the particular modified training image. For instance, the annotations 453 could indicate a ground-truth label for each respective pixel in the object pixels 455, indicating an object category for the respective pixels. In the example modified training image 350, the respective annotations could indicate object categories of "giraffe," "fountain," "fence," "tree," "ground," or other categories for the object pixels.

In some implementations, the modified PLNN 460 receives the modified training images 250, indicating one or more of the object pixels 455, the mask pixels 445, or the annotations 453. Based on the modified training images 250, the modified PLNN 460 trains to generate labels associated with each of the mask pixels 445. In FIG. 4, the modified PLNN 460 determines a first set of labels that includes labels of all (or nearly all) objects that are depicted in the training dataset. For instance, the modified PLNN 460 determines a label set 470 that includes labels of each object that is depicted in the group of modified training images 250. Additionally or alternatively, the modified PLNN 460 determines a second set of labels that includes labels of all (or nearly all) objects that are depicted in a particular image (e.g., from the modified training images 250) on which the modified PLNN 460 is training. For instance, the modified PLNN 460 determines an image-wise label set 475 that includes labels of each object that is depicted in the example modified training image 350. In some cases, one or more of the label sets 470 or 475 is generated based on the annotations 453. Additionally or alternatively, one or more of the label sets 470 and 475 can include labels that indicate object categories (e.g., "giraffe," "tree"), or object instances (e.g., <Giraffe, 1>, <Giraffe, 2>), or both.

For a particular one of the modified training images 250, the modified PLNN 460 determines a label for each mask pixel included in the mask pixels 445. For example, for a mask pixel 345a included in the modified training image 350, the modified PLNN determines a mask label 465. In some cases, a mask label for a particular mask pixel is based on respective distances between the mask pixel and one or more object pixels in the particular modified training image. For example, the modified PLNN 460 determines an object pixel that is nearest to the mask pixel, for each object category indicated by the image-wise label set 475. The nearest object pixel for each category could be determined based on a distance between the mask pixel and the object pixel. In the modified training image 350, the modified PLNN 460 could determine one or more object pixels, such as an object pixel 355a or an object pixel 355b, that are nearest to the mask pixel 345a. The modified PLNN 460 determines, for instance, that the object pixel 355a is the object pixel having the category "tree" that is nearest to the mask pixel 345a. Additionally or alternatively, the object pixel 355b is determined to be the object pixel having the category "ground" that is nearest to the mask pixel 345a. Additional nearest object pixels could be determined for additional categories, such as a nearest "giraffe" object pixel, a nearest "fountain" object pixel, or for other categories in the image 350.

During the training phase, a mask label for each of the mask pixels 445 can be verified, based on a probability that the mask label is correct. In some cases, the probability is based on a ground-truth label associated with a respective one of the mask pixels 445, such as a ground-truth label indicated by the annotations 453. For example, the modified PLNN 460 determines a label probability 463 for the mask label 465. The label probability 463 is based on a ground-truth label for an object pixel that has a location, in the modified training image 350, that corresponds to the location of the mask pixel 345a. In some cases, the label probability 463 can be based on a cross-entropy between the mask label 465 and the ground-truth label for the corresponding object pixel. Additionally or alternatively, the label probability 463 can be based on a smoothness value indicating changes between labels for pixels inside the mask instance and labels for pixels outside of the mask instance. Furthermore, the label probability 463 can be based on the respective distances between the mask pixel 345a and the nearest object pixel for each label in the image-wise label set 475. In some implementations, the label probability 463 is determined based on a multi-term loss function.

In FIG. 4, the modified PLNN 460 generates or verifies (or both) a label for each mask pixel included in one or more of the modified training images 250. Additionally or alternatively, the modified PLNN 460 provides the generated labels, such as in output labels 480. The output labels 480 include, for example, a respective set of labels for each one of the modified training images 250. In some cases, the output labels 480 are provided to an additional computing system. For example, such as during a training phase, the output labels 480 could be retained by the modified PLNN 460 (e.g., for additional training) or provided to a computing system configured to audit the modified PLNN 460 (e.g., for performance verification). Additionally or alternatively, such as during an application phase, the output labels 480 could be provided to a computing system configured to perform an infill operation or otherwise modify images based on pixel labels, such as the digital graphical editing system 190.

In some cases, techniques related to generation or verification of a label are repeated, such as during a training phase. For example, the modified PLNN 460 could determine labels for pixels in a first mask instance from the respective annotated image subgroup 215 for a particular modified training image. Additionally or alternatively, the modified PLNN 460 could determine labels for additional pixels in a second mask instance for the particular modified training image, such as a second mask instance extracted from another image from the respective subgroup 215.

Figure 5:
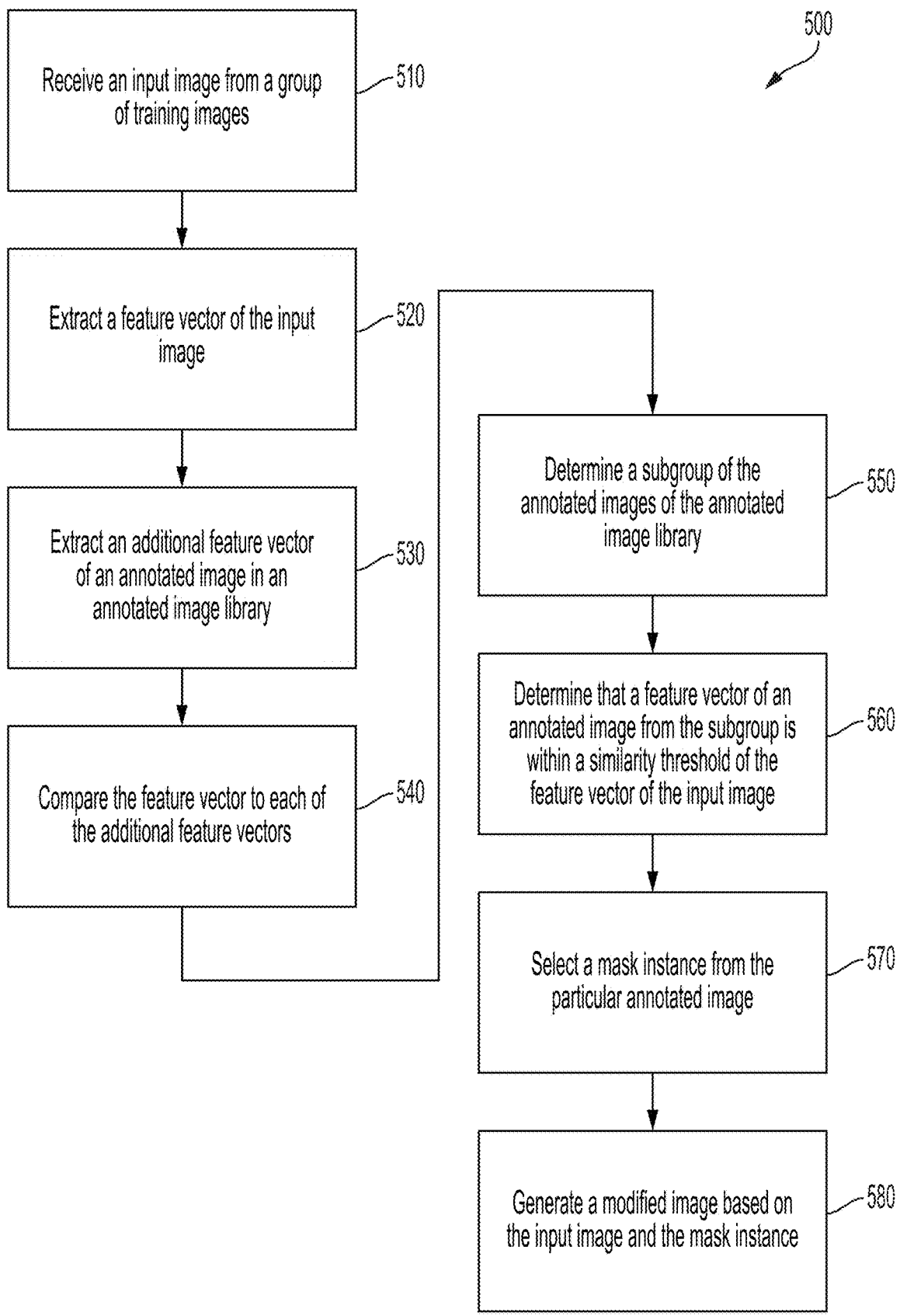
FIG. 5 is a flow chart depicting an example of a process for generating one or more modified training images, according to certain embodiments.

FIG. 5 is a flowchart depicting an example of a process for 500 for generating one or more modified training images. In some embodiments, such as described in regard to FIGS. 1-4, a computing device executing a panoptic labeling system implements operations described in FIG. 5, by executing suitable programming code. For illustrative purposes, the process 500 is described with reference to the examples depicted in FIGS. 1-4. Other implementations, however, are possible.

At block 510, the process 500 involves receiving an input image from a group of training images. For example, a mask extraction module, such as the mask extraction module 240, receives one or more training images, such as the training image group 220. The mask extraction module selects the input image from the received group of training images. In some cases, the training images include (or are otherwise associated with) annotations, such as ground-truth labels indicating one or more objects depicted in the training images.

At block 520, the process 500 involves extracting a feature vector based on the input image. In some cases, a feature-extraction neural network that is included in the mask extraction module generates the extracted feature vector based on the input image. For example, the feature-extraction neural network 230 generates one or more of the feature vectors 222 based on respective training images of the training image group 220.

At block 530, the process 500 involves extracting an additional feature vector of one or more annotated images. The feature-extraction neural network can extract each additional feature vector based on a respective one of the annotated images. For example, the feature-extraction neural network 230 generates one or more of the feature vectors 212 based on respective ones of the imitated images 210. In some cases, the annotated images, such as the annotated image group 210, are received from a library of annotated images, such as the annotated image library 115. Additionally or alternatively, the one or more annotated images include (or are otherwise associated with) additional imitations, such as additional ground-truth labels indicating one or more objects depicted in the annotated images.

One or more operations described herein with respect to blocks 540-560 can be used to implement a step for determining at least one annotated image based on the feature vector and one or more additional feature vector from one or more annotated images. For instance, at block 540, the process 500 involves comparing the feature vector of the input image to each additional feature vector of the one or more annotated images. Comparison of the feature vector and the one or more additional feature vectors can be based on, for example, a cosine distance between feature vectors. For instance, the mask extraction module 240 compares one or more of the feature vectors 212 to one or more of the feature vectors 222 based on a cosine distance between a particular pair of feature vectors.

At block 550, the process 500 involves determining a subgroup of the annotated images of the annotated image library. In some cases, the subgroup of annotated images is associated with the input image. For example, a particular one of the annotated image subgroups 215 can be associated with a particular training image of the training image group 220. In some cases, each particular annotated image in the subgroup is included based on a similarity between the particular annotated image and the input image. Additionally or alternatively, the similarity is based on the comparison of feature vectors respectively associated with the particular imitated image and the input image. For example, the feature vector of the input image can have a relatively short cosine distance to the additional feature vector of particular annotated image.

At block 560, the process 500 involves determining that a particular feature vector of a particular annotated image from the subgroup is within a similarity threshold of the feature vector of the input image. For example, the mask extraction module 240 determines that, for a particular training image of the training image group 220, the associated subgroup includes an annotated image with a feature vector that is within the similarity threshold 247 to the feature vector of the particular training image. In some cases, the similarity threshold may indicate a criteria, such as a minimum cosine distance between compared feature vectors. Additionally or alternatively, the similarity threshold may indicate a quantity, such as a quantity of annotated images having feature vectors most similar to the feature vector of the input image.

At block 570, the process 500 involves selecting a mask instance from the particular annotated image. The mask instance can represent an object that is depicted in the particular annotated image. For example, the mask extraction module 240 generates (or otherwise receives) a mask instance, such as one of the mask instances 245, for an object that is depicted in an annotated image of the subgroup associated with the particular training image. In some cases, the mask instance is selected randomly or pseudo-randomly from one of the annotated images in the subgroup for the input image. Additionally or alternatively, the mask instance is selected based on one or more criteria, such as based on a similarity of the input image to a particular one of the annotated images in the subgroup. For example, the mask extraction module 240 could select a mask instance from an annotated image having a minimum cosine distance (e.g., between feature vectors) to a particular training image, compared to other annotated images in the subgroup for the particular training image.

At block 580, the process 500 involves generating a modified image based on the input image and the mask instance. The modified image can include a combination of digital graphical content of the input image and data indicating a location of the mask instance (e.g., relative to the digital graphical content). For example, the mask extraction module 240 generates one or more of the modified training images 250 by combining a respective training image of the training image group 220 with a respective one of the mask instances 245. In some cases, a modified PLNN that is trained based on modified training images that include mask instances from other images can label pixels with higher accuracy. For example, training based on a mask instance included in a modified training image can improve accuracy of labeling pixels in a shape (e.g., the mask) that resembles other objects depicted in the image.

In some implementations, one or more operations related to the process 500 are repeated. For example, a mask extraction module (or another component included in a panoptic labeling system) can perform operations related to one or more of blocks 510, 520, or 530 for multiple received input images or multiple annotated images, such as extracting the feature vectors 212 based on each annotated image of the annotated image group 210, or extracting the feature vectors 222 based on each training image of the training image group 220. Additionally or alternatively, the mask extraction module (or another component in the panoptic labeling system) can perform operations related to one or more of blocks 540, 550, 560, 570, or 584 multiple received input images, such as generating the annotated image subgroups 215 for each training image of the training image group 220, or generating the modified training images 250 based on each training image of the group 220 and the respective mask instances 245.

Figure 6:
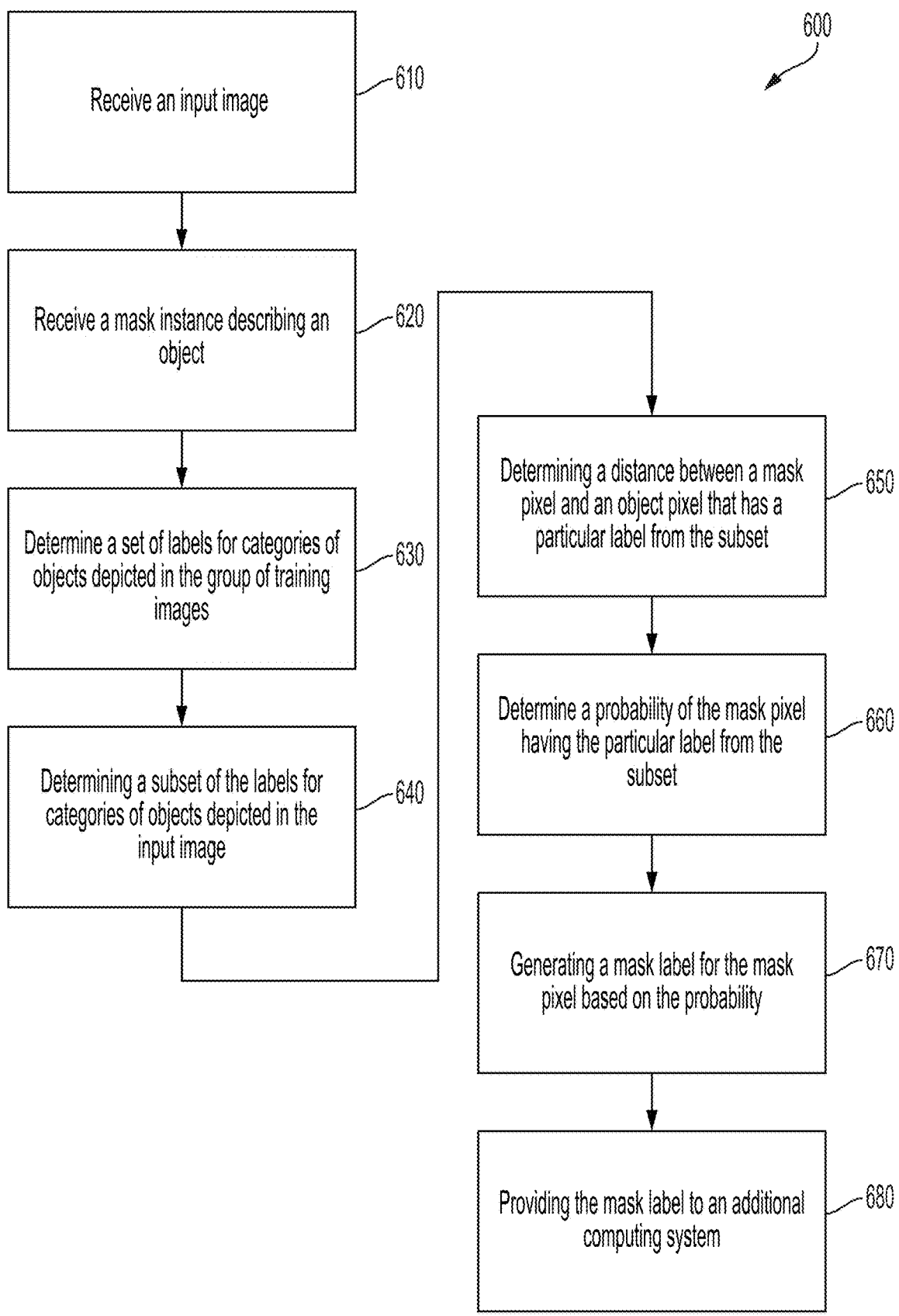
FIG. 6 is a flow chart depicting an example of a process for generating mask labels for pixels in an image, according to certain embodiments.

FIG. 6 is a flow chart depicting an example of a process 600 for generating a mask label for one or more pixels included in an image. In some embodiments, such as described in regard to FIGS. 1-5, a computing device executing a panoptic labeling system implements operations described in FIG. 6, by executing suitable program code. For illustrative purposes, the process 600 is described with reference to the examples depicted in FIGS. 1-5. Other implementations, however, are possible.

At block 610, the process 600 involves receiving an input image. In some cases, the input image is received from a group of training images, such as the training image group 220. Additionally or alternatively, the input image is received from an additional computing system, such as the target image 195.

At block 620, the process 600 involves receiving a mask instance that describes an object. In some cases, the mask instance describes an object depicted in an annotated image that is associated with the input image, such as a respective one of the mask instances 245. Additionally or alternatively, the mask instance describes an object indicated for an infill operation, such as an infill operation indicated by the digital graphics editing system 190.

In some implementations, one or more of the input image or the mask instance are included in a modified training image, such as one of the modified training images 250. In some cases, a modified panoptic labeling neural network receives one or more of the input image or the mask instance via a respective channel of the modified training image. For example, the modified panoptic labeling neural network 460 could receive at least one of the modified training images 250 that includes one or more channels representing the object pixels 455 and one or more channels representing the mask pixels 445. Additionally or alternatively, the modified panoptic labeling neural network 460 could receive a modified input image, such as the modified input image 155 based on the target image 195, that includes one or more channels representing the pixels of objects depicted in the modified input image and one or more channels representing mask pixels of a mask instance describing an object indicated for an infill operation.

At block 630, the process 600 involves determining a set of labels indicating categories of objects. In some cases, the set of labels indicates categories for objects that are depicted in one or more images in the group of training images. For example, the modified panoptic labeling neural network 460 determines the label set 470 based on objects that are depicted in one or more of the modified training images 250. Additionally or alternatively, the set of labels could be based upon annotations describing the group of images, such as the annotations 453 for each of the modified training images 250.

At block 640, the process 600 involves determining a subset of the set of labels. In some cases, the label subset indicates categories for objects that are depicted in the input image, such as an image-wise label set. For example, the modified panoptic labeling neural network 460 determines the image-wise label set 475 based on objects that are depicted in a particular one of the modified training images 250, e.g., the modified training image 350. Additionally or alternatively, the label subset could be based on annotations describing the input image, such as the annotations 453 for a particular one of the modified training images 250. In some implementations, a trained modified panoptic labeling neural network could generate (or otherwise receive) an image-wise label set indicating objects depicted in a target image, such as the target image 195. For example, the image-wise label set could indicate objects depicted in the modified input image based on the target image.

At block 650, the process 600 involves determining a respective distance between one or more mask pixels and one or more object pixels. In some cases, the mask pixel can include (or represent) a pixel location in the mask instance. Additionally or alternatively, the object pixel can include (or represent) a pixel location in the input image. In some implementations, the one or more object pixels have respective labels from the label subset. For example, the modified panoptic labeling neural network (or another component in the panoptic labeling system) can determine, for each particular label from the label subset, respective distances between each mask pixel included in the mask instance and at least one object pixel having the particular label. In some cases, the distances associated with a particular mask pixel are based on the nearest object pixel having the particular label. For instance, the modified panoptic labeling neural network 460 determines a distance between the mask pixel 345a and the object pixels 355a and 355b based on a determination that the object pixels 355a and 355b are the closest object pixels having their respective labels (e.g., closest to the mask pixel).

At block 660, the process 600 involves determining a probability that a mask pixel has a particular label from the label subset. In some cases, the modified panoptic labeling neural network determines a respective probability for each mask pixel included in the mask instance, such as the label probability 463 calculated by the modified panoptic labeling neural network 460. Additionally or alternatively, each respective label probability can be based on a multi-term loss function, such as in Equations 1 and 2 below. In some implementations, such as during a training phase, a respective label probability is verified based on a ground-truth label corresponding to the respective mask pixel. In some implementations, such as during an application phase, a respective label probability is calculated based on parameters of the modified panoptic labeling neural network, such as parameters determined during a training phase.

At block 670, the process 600 involves generating a mask label for the mask pixel, such as based on the respective probability for the mask pixel. In some cases, the modified panoptic labeling neural network generates a respective mask label for each mask pixel included in the mask instance, such as the mask label 465 generated by the modified panoptic labeling neural network 460. Additionally or alternatively, the generated mask label is included in an output of the modified panoptic labeling neural network, such as one or more of the output labels 480.

At block 680, the process 600 involves providing the mask label to an additional computing system, such as a digital graphics editing system. As a non-limiting example, one or more mask labels could be provided as an output from the modified PLNN or panoptic labeling system, and received as an input to a computing system configured to complete a graphical editing operation based on the mask labels. For instance, the panoptic labeling system 105 provides one or more of the output labels 180 to the digital graphics editing system 190. The digital graphics editing system 190 could be configured to perform an infill operation based on mask labels indicated by the output labels 180.

In some implementations, one or more operations related to process 600 are repeated. For example, operations related to one or more of 640, 650, 660, or 670 could be repeated for each one of a group of modified training images. Additionally or alternatively, operations related to one or more of 650, 660, 670, or 680 could be repeated for each mask pixel included in a mask instance, including multiple mask instances associated with multiple input images.

In some implementations, one or more operations related to process 600 are performed by a panoptic labeling system that is undergoing training, such as training to generate labels. Additionally or alternatively, one or more operations related to process 600 are performed by a trained panoptic labeling system, such as to generate one or more labels for an input image (e.g., a target image) that is provided by an additional computing system. For example, the panoptic labeling system 105 could perform operations related to process 600 while training, or to generate labels for the target image 195 provided by the digital graphics editing system 190. In some implementations, one or more operations related to the process 600 are omitted by a panoptic labeling system. For example, a trained modified panoptic labeling neural network could omit operations related to one or more of blocks 630 or 640, such as while generating labels for a target image received from an additional computing system (e.g., generating labels for the target image 195 from the digital graphics editing system 190).

In some implementations, a modified PLNN determines a mask label for a mask pixel based on a subset of labels for objects depicted in a training image or an input image. For example, during a training phase, a modified PLNN can determine a boundary region of a mask instance. Additionally or alternatively, the modified PLNN can determine a mask label based on labels of pixels that are included in the boundary region. In some cases, such as during a training phase, the modified PLNN determines a loss (e.g., a term in a multi-loss function) based on a smoothness between pixels that are within the boundary region. For instance, the smoothness loss term could indicate a change or a similarity between a first label of a pixel on an inner region of the boundary region and a second label of an additional pixel on an outer region of the boundary region.

Figure 7:
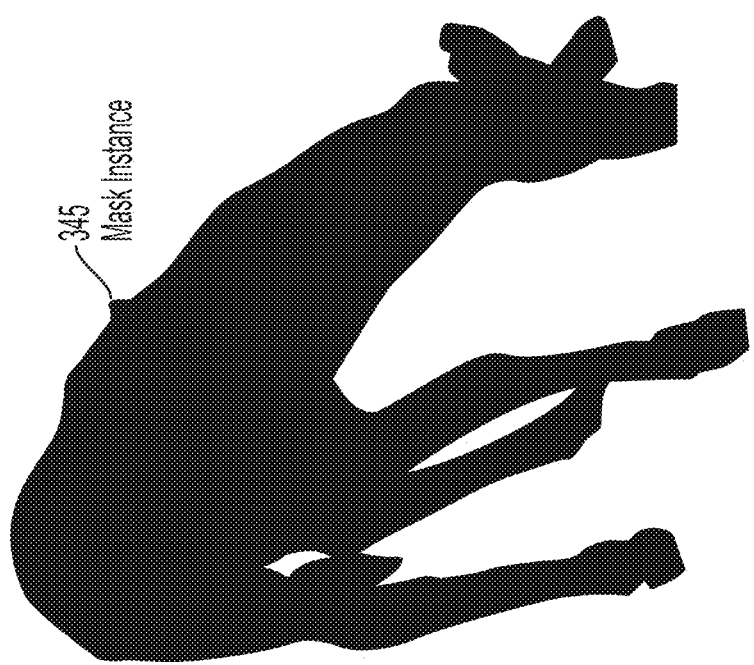
FIG. 7 is a diagram depicting an example of a boundary region associated with a mask instance received by a modified panoptic labeling neural network, according to certain embodiments.
Figure 7:
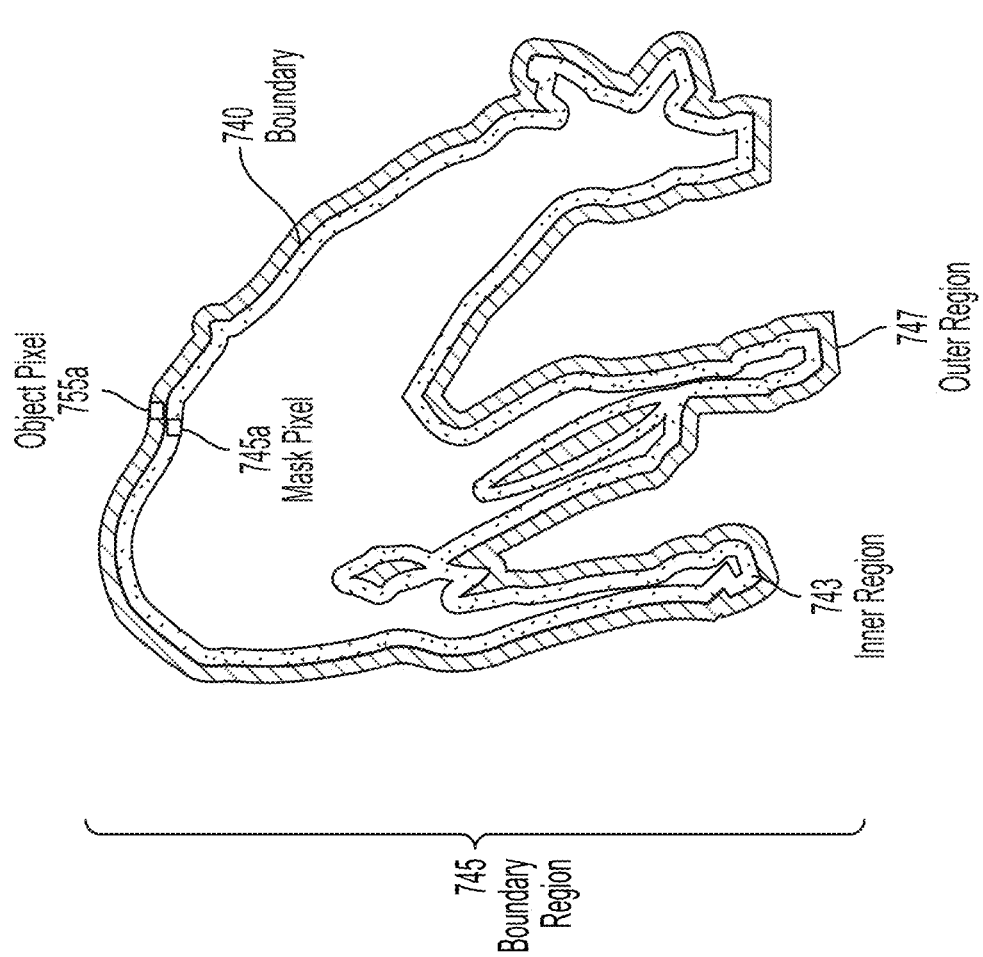

FIG. 7 depicts an example of a boundary region 745. The boundary region 745 is received by a modified PLNN, such as the modified PLNN 460. Additionally or alternatively, the boundary region 745 is associated with a respective mask instance that is received by the modified PLNN, such as the example mask instance 345 described in regard to the modified training image 350. In some cases, the boundary region 745 is determined based on a boundary of the respective mask instance, such as a boundary 740 of the mask instance 345. For example, the boundary region 745 indicates an edge of pixels that are included in the mask instance 345, i.e., indicating the boundary 740 between pixels that are included in the mask instance 345 and additional pixels that are excluded from the mask instance 345. A step for identifying a boundary region can be implemented in any suitable manner. For instance, in FIG. 7, the modified PLNN 460 determines the boundary region 745, such as by applying a morphological operation to determine the shape and edges of the mask instance. However, other implementations of a step for identifying a boundary region are possible, such as the boundary region 745 being determined by an additional software module or computing system that is configured to determine a shape and/or edges of a mask instance.

In some implementations, the boundary region 745 includes an inner region 743. The inner region 743 can include (or otherwise indicate) a first subset of pixels that are included in the mask instance 345, such as a mask pixel 745*a*. Additionally or alternatively, the first subset of pixels in the inner region 743 can include pixels that are included in the mask instance 345 and are located at or near the boundary 740 of the mask instance 345. For example, the inner region 743 could include mask pixels having locations contiguous with the boundary 740 (e.g., one or more edges of the mask pixel is included in the boundary). Additionally or alternatively, the inner region 743 could include mask pixels having locations that are close to the boundary 740 (e.g., the location of the mask pixel is within a threshold distance to the boundary). As an example, and not by way of limitation, the inner region 743 can include mask pixels that are contiguous with the boundary 740 and additional mask pixels that have a location within two distance units (e.g., pixel widths) from the boundary 740.

Additionally or alternatively, the boundary region 745 includes an outer region 747. The outer region 747 can include (or otherwise indicate) a second subset of pixels that are excluded from the mask instance 345, such as an object pixel 755*a*. In some cases, pixels in the outer region 747 are included in a modified training image with which the mask instance 345 is associated, such as object pixels in the modified training image 350. Additionally or alternatively, the second subset of pixels in the outer region 747 can include pixels that are excluded from the mask instance 345 and are located at or near the boundary 740 of the mask instance 345. For example, the outer region 747 could include object pixels having locations contiguous with the boundary 740 (e.g., one or more edges of the object pixel is included in the boundary). Additionally or alternatively, the outer region 747 could include object pixels having locations that are close to the boundary 740 (e.g., the location of the object pixel is within a threshold distance to the boundary). As an example, and not by way of limitation, the outer region 747 can include object pixels that are contiguous with the boundary 740 and additional object pixels that have a location within two distance units (e.g., pixel widths) from the boundary 740.

In some cases, the boundary region 745 includes a data structure that indicates one or more of pixels that are included in the inner region 743, or pixels that are included in the outer region 747. Additionally or alternatively, the data structure of the boundary region 745 indicates the boundary 740 between the inner region 743 and the outer region 747. The boundary region 745 can indicate a location of the boundary 740, such as a location between a first pixel of the inner region 743 and a second pixel of the outer regions 747. For convenience, and not by way of limitation, FIG. 7 depicts the boundary 740 as a black line, but other representations are possible, including representations not intended for human interpretation. For example, a data structure could indicate a boundary as a location without a width, such as a location that is designated between pixels, that does not include a pixel.

In some implementations, a label for a mask pixel is selected based on one or more labels of object pixels that are included in a boundary region. In FIG. 7, the modified PLNN 460 can be configured to generate one or more mask labels for the pixels in the mask instance 345 based on the labels of one or more object pixels included in the boundary region 745. For instance, a respective label for one or more of mask pixels 345*a* or 745*a* could be generated based on labels of object pixels in the outer region 747. In some cases, selecting a mask label based on labels for a subset of pixels, i.e., object pixels that are included in a boundary region, can improve the accuracy of the label selection. For example, selecting a mask label based on object pixels that are contiguous with or near to a boundary of a mask instance could prevent selection of a label for an object that is in a different location of the image.

In some implementations, a mask pixel that is included in the inner region 743 is adjacent to (e.g., shares an edge with) at least one object pixel that is included in the outer region 747. For instance, the mask pixel 745*a* is adjacent to the object pixel 755*a*, such that a portion of the boundary 740 is located at a shared edge of the pixels 745*a* and 755*a*. In some cases, a modified PLNN, such as the modified PLNN 460, is configured to determine a loss based on one or more pairs of adjacent pixels in the boundary region 745, such as by calculating a variation of labels assigned to adjacent pixels included in the boundary region 745. The pairs of adjacent pixels can include a shared edge that includes a portion of the boundary 740. The modified PLNN 460 determines the loss based on a smoothness between the paired pixels that share the boundary 740, such as by calculating variation between labels for object pixels in the outer region 747 and labels for mask pixels in the inner region 743. For example, a relatively low loss value (e.g., relatively little variation) can indicate that labels for the mask pixels are relatively similar to labels for the object pixels.

Image Modification Techniques

In a panoptic labeling system, such as the panoptic labeling system 105, one or more modified images are received or generated. For example, a mask extraction module, such as one or more of the mask extraction modules 140 or 240, generates a modified input image from an image received from an additional computing system, such as the target image 195. Additionally or alternatively, the mask extraction module generates multiple modified images, such as one or more of the modified training images 150 or 250, from one or more of a group of training images or a group of annotated images.

In some cases, a mask extraction module generates modified training images based on feature vectors, such as the groups of feature vectors 212 and 222 for, respectively, the groups of annotated images 210 and training images 220. For example, the mask extraction module receives a group of training images that includes a quantity of n images. For convenience, and not by way of limitation, the group of training images can be referred to as $S_i$, and each training image can be referred to as an image i. In some cases, each training image i includes (or is otherwise associated with) one or more ground-truth labels that indicate an object category for a respective pixel of the image i.

In some cases, one or more feature vectors are extracted from the training image group $S_i$. As an example, and not by way of limitation, features can be extracted via a convolutional neural network (e.g., VGG16), a residual neural network (e.g., ResNet), or another suitable feature-extraction neural network that is configured to extract features from a graphical image. In some cases, prior to feature extraction, one or more images i in the training image group $S_i$ are resized (e.g., depicted subject matter is modified to visually appear smaller or larger), cropped (e.g., pixels are removed or added to decrease or increase a size of the image), or both. For example, the feature-extraction neural network could receive the training image group $S_i$ in which each image i is resized and cropped. A non-limiting example of a resized image is an image having dimensions 256×256 pixels. A non-limiting example of a cropped image is an image having dimensions 224×224 pixels.

The feature-extraction neural network may receive the training image group $S_i$ as an input. In some cases, the feature-extraction neural network may extract a global feature vector $X_i$ indicating all features of the group $S_i$. Additionally or alternatively, the feature-extraction neural network may extract a respective feature vector $x_i$ indicating a respective set of features for each image i. In some cases, one or more techniques related to feature extraction are performed (e.g., by the feature-extraction neural network) for a group of annotated images $R_q$, including one or more respective annotated images q. Each annotated image q can be associated with a respective feature vector $y_q$. An example of the training image group $S_i$ includes the training image group 220. An example of the annotated group image $R_q$ includes the annotated image group 210.

The mask extraction module can be configured to receive the feature vector $x_i$ for each image i of the training image group $S_i$. Additionally or alternatively, the mask extraction module can be configured to receive the feature vector $y_q$ for each image q of the annotated image group $R_q$. For each training image i, the mask extraction module determines one or more annotated images q that are similar to the training image i. For example, the mask extraction module can determine a cosine distance between the feature vector $x_i$ for each training image i and the feature vector $y_q$ for each annotated image q. Based on the cosine distances, the mask extraction module determines one or more of the annotated images q that are similar to the training image i, e.g., have feature vectors $y_q$ within a threshold cosine distance to the feature vector x. In some cases, an annotated image q that has a feature vector $y_q$ that is close to (e.g., by cosine distance) a feature vector $x_i$ of a training image i can depict content that is similar to content depicted by the training image i.

In some implementations, for each training image i, the mask extraction module generates a subgroup $r_q$ of the annotated image group $R_q$. The subgroup $r_q$ includes, for example, one or more of the annotated images q that have feature vectors $y_q$ within the threshold cosine distance to the feature vector $x_i$. Additionally or alternatively, the subgroup $r_q$ includes a quantity k of the annotated images q that have feature vectors $y_q$ closest (e.g., by cosine distance) to the feature vector $x_i$. An example of the subgroup $r_q$ includes one or more of the annotated image subgroups 215.

In some cases, the mask extraction module generates one or more modified training images based on the subgroups $r_q$. For convenience, and not by way of limitation, the group of modified training images can be referred to as $M_i$ and each modified training image $m_i$ can be associated with a respective training image i. For each training image i, for example, the mask extraction module selects a particular annotated image q from the subgroup $r_q$ that is associated with the training image i. Additionally or alternatively, the mask extraction module selects an object instance that is depicted by the particular annotated image q. The selection of the particular annotated image q, the object instance, or both, can be a random selection or can be based on an indication received by the mask extraction module. In some implementations, the mask extraction module creates a modified training image $m_i$ based on a combination of the training image i and a mask instance representing the selected object instance. The modified training image $m_i$ can include data that represents the content of the training image i, such as image data indicating colors (e.g., RGB) or locations of pixels that represent the depicted content. Additionally or alternatively, the modified training image $m_i$ can include data that represents the mask instance, such as image data indicating colors (e.g., black-and-white) or locations of pixels that represent the mask instance. Locations of mask pixels could be co-located with locations of training image content, such as if the mask instance has a position that overlaps one or more pixels depicting content of the image i. In some cases, the modified training image $m_i$ includes at least one channel that indicates the training image i, such as a respective channel for red, green, or blue pixel data. Additionally or alternatively, the modified training image $m_i$ includes at least one channel that indicates the mask instance, such as a respective channel for black-and-white pixel data. In some cases, each one of the modified training images $M_i$ includes four channels, such as a three channels for, respectively, red, green, and blue color data, and a fourth channel for mask instance data. Additionally or alternatively, each one of the modified training images $M_i$ includes (or otherwise indicates) ground-truth labels for some or all of the pixels included in the respective training image i.

Label Generation Techniques

In a panoptic labeling system, such as the panoptic labeling system 105, one or more labels are generated for pixels in an input image. The input image includes, for example, a target image, such as the target image 195, a modified training image, such as one of the modified training images 150 or 250, or another suitable image having an area of digital content (e.g., a group of one or more pixels) that are designated for labeling. In some cases, a modified PLNN, such as one or more of the modified PLNNs 160 or 460, generates labels for respective pixels in the input image. Additionally or alternatively, the modified PLNN trains to generate labels, such as by verifying the generated labels against ground-truth labels respective pixels. During a training phase, for example, the modified PLNN generates and verifies labels for pixels in one or more modified training images. During an application phase, for example, the modified PLNN generates labels for pixels in a target image, such as labels generated without verification.

During a training phase, the modified PLNN determines and evaluates one or more parameters for components of the neural network. In some cases, evaluation of the neural network parameters includes determining a multi-term loss function. The multi-term loss function is based on, for example, one or more comparisons between a respective pair of labels for one or more pixels in a modified training image.

In some implementations, during a training phase, the modified PLNN receives a group of modified training images. As described above, the group of modified training images can be referred to as $M_i$ and each modified training image $m_i$ can include (or otherwise indicate) a respective training image i, a respective mask instance, and ground-truth labels for some or all of the pixels included in the respective training image i. For convenience, and not by way of limitation, the location of each pixel in a modified training image $m_i$ can be referred to as pixel location j. In some cases, a particular pixel location j can correspond to pixel data on multiple channels. For instance, the pixel location j can correspond to a pixel with RGB data (e.g., depicting content in the training image i) and also correspond to a mask pixel with mask data (e.g., indicating the mask instance included in the modified training image $m_i$).

For convenience, and not by way of limitation, a label set C can denote a set of all ground-truth labels in the modified training images $M_i$ (e.g., the label set 470). For instance, the label set C can include a label for each object category that is depicted in any one of the modified training images $M_i$. Additionally or alternatively, an image-wise label set $C_i$ can denote a set of ground-truth labels for the respective training image i in the modified training image $m_i$. For instance, the image-wise label set $C_i$ can include a label for object categories that are depicted in the respective training image i. In some cases, the image-wise label set $C_i$ excludes ground-truth labels of pixels that are co-located with the mask instance of the modified training image $m_i$. For example, the image-wise label set $C_i$ omits a ground-truth label of a particular training image pixel that has a same location j as a mask pixel.

In some implementations, the modified PLNN determines a first term of a multi-term loss function based on the label sets C and $C_i$. The first term can be, for example, a cross-entropy loss term. Equation 1 provides an example of a cross-entropy loss term that may be used in a multi-term loss function for verifying generated labels.

$$d(j)\mathrm{CE}_{C_i}(l_j, \hat{l}_j) + \lambda \mathrm{CE}_{C \setminus C_i}(l_j, \hat{l}_j) \qquad \text{Eq. 1}$$

In Equation 1, $l_j$ represents a predicted label at the location j, and $\hat{l}_j$ represents a ground-truth label at the location j. In Equation 1, CE is a cross-entropy operator. For example, the term $\mathrm{CE}_{C_i}(l_j, \hat{l}_j)$ indicates a cross-entropy between the predicted and ground-truth labels $l_j$ and $\hat{l}_j$, across the image-wise label set $C_i$. In some cases, the term $\mathrm{CE}_{C_i}(l_j, \hat{l}_j)$ is weighted by a decay d(j) for each pixel location j. For example, the decay d(j) measures the reciprocal of the distance between pixel location j and the nearest pixel location for each different label in the image-wise label set $C_i$ (e.g., respective distances between the locations of mask pixel 345a and object pixels 355a and 355b). In some cases, the decay d(j) improves an accuracy of the predicted labels $l_j$, such as by increasing a weight of predicted labels that have relatively short distances (e.g., between pixels associated with the labels) to a label in the image-wise label set $C_i$. For instance, the example mask pixel 345a has a relatively shorter distance to object pixel 355a and a relatively longer distance to object pixel 355b. For a label of the mask pixel 345a, a predicted label that is based on a label of the closer object pixel 355a is weighted more heavily (e.g., reciprocal distance indicated by the decay d(j)) than a predicted label based on a label of the more distant object pixel 355b.

Additionally or alternatively, the term $\mathrm{CE}_{C \setminus C_i}(l_j, \hat{l}_j)$ indicates a cross-entropy between the predicted and ground-truth labels $l_j$ and $\hat{l}_j$, across the complement label set $C \setminus C_i$ (e.g., a set of labels that are included in set C and excluded from set $C_i$). In some cases, the term $\mathrm{CE}_{C \setminus C_i}(l_j, \hat{l}_j)$ is weighted by a weight value $\lambda$. In some cases, the weight value $\lambda$ is assigned a relatively small value (e.g., $1 \gg \lambda > 0$). In some cases, the weight value $\lambda$ increases an accuracy of the predicted labels $l_j$, such as by decreasing a weight of predicted labels that indicate objects that are not depicted in the modified training image $m_i$. For the example mask pixel 345a, a first predicted label that is present in the image-wise label set 475 (e.g., represents an object that is present in the modified training image 350) is weighted more heavily than a second predicted label that is present in the label set 470, but omitted from the image-wise label set 475 (e.g., represents an object that is not present in the modified training image 350).

In some implementations, a penalty term can be included in the multi-term loss function. For example, the modified PLNN determines a boundary region from where predicted labels are generated, such as the boundary region 745. For convenience, and not by way of limitation, a bounded label set $\mathcal{A}_i$ can denote labels that are associated with pixels that are in the boundary region. In some cases, the image-wise label set $C_i$ can include labels from the bounded label set $\mathcal{A}_i$ and exclude labels that are not included in the set $\mathcal{A}_i$, such that one or more of the terms $\mathrm{CE}_{C_i}(l_j, \hat{l}_j)$ or $\mathrm{CE}_{C \setminus C_i}(l_j, \hat{l}_j)$ are based on labels in the bounded label set $\mathcal{A}_i$. Additionally or alternatively, a result of the cross-entropy loss term, such as a result of Equation 1 (or a result of a term within Equation 1), can be penalized (e.g., discarded, changed, re-evaluated) if the predicted labels $l_j$ are not included in the bounded label set $\mathcal{A}_i$.

In some implementations, the modified PLNN determines a second term of a multi-term loss function based on the bounded label set $\mathcal{A}_i$ for a boundary region. The second term can be, for example, a smoothness loss term. Equation 2 provides an example of a smoothness loss term that may be used in a multi-term loss function for verifying generated labels.

$$\sum_{j \in \mathcal{F}_1 \cup \mathcal{F}_2} TV(l_j) \qquad \text{Eq. 2}$$

In Equation 2, $\mathcal{F}_1$ represents an outer boundary region (e.g., such as the outer region 747). Additionally or alternatively, $\mathcal{F}_2$ represents an inner boundary region (e.g., such as the inner region 743). The term $\mathcal{F}_1 \cup \mathcal{F}_2$ indicating a union of the outer and inner boundary regions, represents the boundary region that is correlated with the bounded label set $\mathcal{A}_i$. In Equation 2, TV is a total variation operator. For example, the term $TV(l_j)$ indicates a total variation of the predicted labels $l_j$ at each location j that is included in the union of the outer and inner boundary regions. In some cases, $l_j$ is a d-dimensional vector, where d is the size of the predicted label set.

In Equation 2, the operator TV calculates the absolute difference on each dimension of the d-dimensional vector $l_j$. Additionally or alternatively, the absolute differences are summed over the dimensions of the vector $l_j$. In some cases, the smoothness loss term improves an accuracy of the predicted labels $l_j$, such as by calculating a summed change (e.g., absolute differences) of labels predicted for pixels in the boundary region represented by $\mathcal{F}_1 \cup \mathcal{F}_2$. For example, predicted labels $l_j$ that are similar between pixels in the outer boundary region $F_1$ and additional pixels in the inner boundary region $F_2$ can reduce a value of the smoothness loss term, indicating an increase in smoothness between the outer and inner boundary regions at the edge of a mask instance (e.g., similar labels between boundary regions 743 and 747 for the mask instance 345).

Figure 8:
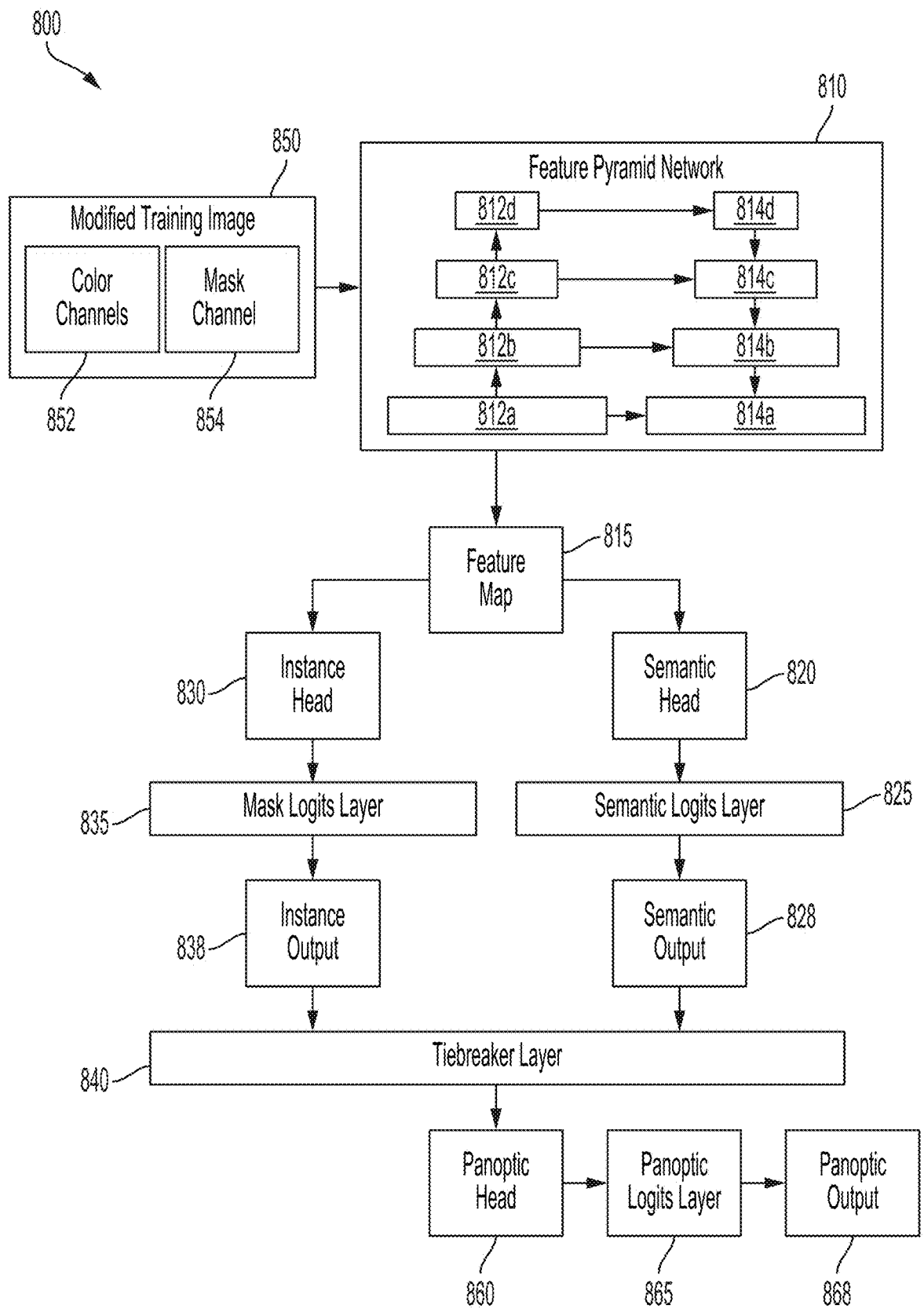
FIG. 8 is a diagram depicting an example architecture of a modified panoptic labeling neural network, according to certain embodiments.

FIG. 8 is a diagram depicting an example of a modified panoptic labeling neural network 800 with multiple modules. Each module includes, for example, one or more blocks, such as neural networks or sub-networks implemented via programming code executable by processing hardware. For example, a block (e.g., sub-network) is implemented via programming code to perform operations described in various examples discussed herein. In some embodiments, the modified PLNN 800 is included in a panoptic labeling system, such as the panoptic labeling system 105.

The modified PLNN 800 receives a modified input image 850. During a training phase, the modified input image 850 may be a modified training image, such as described at least in regard to FIG. 4. During and application phase, a trained implementation of the modified PLNN 800 may receive a modified input image that is based on a target image, such as the modified input image 155 based on the target image 195, that includes one or more channels representing pixels of objects depicted in the modified input image and one or more channels representing mask pixels of a mask instance describing an object indicated for an infill operation.

In some cases, the modified input image 850 has a size including a width w, a height h, and a number of image channels c. The size of the modified input image 850 is represented, for example, via the notation w×h×c. As a non-limiting example, a modified input image having a width of 224 pixels, a height of 224 pixels, and four image channels (e.g., red data, green data, blue data, mask data) has a size notated as 224×224×4. In some cases, the modified input image 850 includes at least one color channel, such as color channels 852. The color channels 852 can represent an input image that depicts digital graphical content, as described elsewhere herein. Each of the color channels 852 can represent a particular type of color data (e.g., assigned to pixels included in the training image), such as a first channel for red data, a second channel for green data, and a blue channel for blue data. In some cases, the color channels 852 represent the color data as a vector, such as a vector of numbers that represent a presence of a respective color at a particular pixel location (e.g., 1 or 0 indicating presence or absence), or an intensity of the respective color at the particular pixel location (e.g., 0-255 indicating an intensity), or other suitable representations of color data. Additionally or alternatively, the modified input image 850 includes at least one mask channel, such as a mask channel 854. The mask channel 854 can represent mask data, such as a mask instance that is associated with the input image represented by the color channels 852, as described elsewhere herein. In some cases, the mask channel 854 represents the mask data as a vector, such as a vector of numbers that represent a presence of the mask instance at a particular pixel location (e.g., 1 or 0 indicating presence or absence), or other suitable representations of mask data.

Although the modified input image 850 is described as including channels represented by vectors of numbers, other configurations are possible. For example, a channel could be represented by an array, a database, a database record, or another suitable data structure. Additionally or alternatively, color data or mask data could be represented by Boolean data, string data, or other suitable data types. In some cases, the modified input image 850 is represented by one or more data structures or data types that are not intended for human interpretation.

In some implementations, the modified PLNN 800 includes one or more neural networks that are capable of extracting image features, such as a feature pyramid neural network 810. For example, the feature pyramid neural network 810 receives the modified input image 850 and extracts one or more features of the modified input image 850 based on the color and mask channels 852 and 854. In some cases, the feature pyramid neural network 810 includes one or more layers that are arranged in a bottom-up pathway, such as one or more of layers 812*a*, 812*b*, 812*c*, or 812*d* (referred to herein as bottom-up layers 812). Additionally or alternatively, the feature pyramid neural network 810 includes one or more layers that are arranged in a top-down pathway, such as one or more of layers 814*a*, 814*b*, 814*c*, or 814*d* (referred to herein as top-down layers 814).

In FIG. 8, the bottom-up layers 812 are configured such that a downsampled image output (e.g., having a lower resolution than a received input) of a previous layer is provided as an input to a subsequent layer. For example, the layer 812*a* receives the modified input image 850, and provides to the subsequent layer 812*b* a first downsampled image based on the modified input image 850. Additionally or alternatively, the layer 812*b* provides to the subsequent layer 812*c* a second downsampled image based on the first downsampled image, and the layer 812*c* provides to the subsequent layer 812*d* a third downsampled image based on the second downsampled image.

In some cases, one or more of the bottom-up layers 812 provides a respective feature map to a respective one of the top-down layers 814, such as a lateral feature map received via a lateral connection. Additionally or alternatively, one or more of the top-down layers 814 are configured such that an upsampled feature map output (e.g., having a higher resolution than a received input) of a previous layer is provided as an input to a subsequent layer. One or more of the top-down layers 814 can be configured to generate a respective upsampled feature map based on a combination of a lateral feature map received from a bottom-up layer and an upsampled feature map received from another top-down layer. As a non-limiting example, a particular top-down layer could generate its respective upsampled feature map output based on an element-wise addition of a 1×1 convolution of a lateral feature map received from a bottom-up layer and a 2× (e.g., times two) upsampled feature map received from an additional top-down layer.

In FIG. 8, the layer 814*d* receives a first lateral feature map from the layer 812*d*, and provides to the subsequent layer 814*c* a first upsampled feature map based on the first lateral feature map. In some cases, the first upsampled feature map is further based on a combination of the first lateral feature map and a null feature map (e.g., received at a top-down input to the layer 814*d*). Additionally or alternatively, the layer 814c receives the first upsampled feature map from the layer 814d and a second lateral feature map from the layer 812c. Based on a combination of the first upsampled feature map and the second lateral feature map, the layer 814c generates a second upsampled feature map. The subsequent layer 814b receives the second upsampled feature map from the layer 814c and a third lateral feature map from the layer 812b. Based on a combination of the second upsampled feature map and the third lateral feature map, the layer 814b generates a third upsampled feature map. The subsequent layer 814a receives the third upsampled feature map from the layer 814b and a fourth lateral feature map from layer 812a. Based on a combination of the third upsampled feature map and the fourth lateral feature map the layer 814a generates a fourth upsampled feature map. Although FIG. 8 is depicted as having four bottom-up layers 812 and four top-down layers 814, other configurations are possible, such as a feature pyramid neural network having more or fewer bottom-up or top-down layers.

The feature pyramid neural network 810 can generate one or more feature maps, such as a feature map 815, that are based on feature maps output from one or more of the bottom-up layers 812 or the top-down layers 814. The feature map 815 can include, for example, one or more of the upsampled feature maps that are generated by the top-down layers 814. Additionally or alternatively, the feature map 815 can include a combination of one or more of the upsampled feature maps, such as a concatenation, a convolution, or another suitable combination of the upsampled feature maps.

In some implementations, the modified PLNN 800 includes one or more neural networks that are capable of identifying objects or object instances (or both) that are depicted in a digital graphical image, based on features (e.g., a feature map) of the digital graphical image. For convenience, and not by way of limitation, a neural network that is capable of identifying objects or object instances can be referred to as a head. For example, the modified PLNN 800 can include one or more of a semantic head 820, an instance head 830, or a panoptic head 860. In FIG. 8, at least one feature map that is output from the feature pyramid neural network 810, such as the feature map 815, is provided to one or more of the semantic head 820 or the instance head 830. The semantic head 820 and the instance head 830 are each configured, for example, to identify one or more object instances that are depicted in the modified input image 850, based on the features indicated by the feature map 815.

In some cases, the semantic head 820 is configured to perform a semantic segmentation analysis of the feature map 815, such as by identifying categories of objects based on large-scale features, low-resolution features, or other features that indicate semantically meaningful content of the modified input image 850. The semantic head 820 can generate a particular object category for a particular group of pixels included in the modified input image 850, such as an object category of "person" for a group of pixels that, based on semantic segmentation analysis, represents a person. For convenience, and not by way of limitation, object categories generated via semantic segmentation analysis, e.g., by the semantic head 820, can be referred to as semantic object categories. A semantic logits layer 825 calculates, for each semantic object category, a respective probability that the semantic head 820 has generated a correct semantic object category for the respective group of pixels (e.g., correctly identified the depicted object). An output from the semantic head 820, such as a semantic output 828, can include (or otherwise indicate) one or more of the semantic object categories or the respective probabilities of the semantic object categories.

Additionally or alternatively, the instance head 830 is configured to perform an instance segmentation analysis of the feature map 815, such as by identifying particular instances of objects based on small-scale features, high-resolution features, or other features that indicate a particular instance of categorized objects. The instance head 830 can generate a bounding box for a particular object instance for a particular group of pixels included in the modified input image 850, such as a bounding box for a particular group of pixels that, based on instance segmentation analysis, represent a particular person (e.g., out of a group of depicted people). In addition, the instance head 830 can generate a classification for the particular object instance, such as a classification indicating an object category to which the particular object instance belongs. Furthermore, the instance head 830 can generate a segmentation mask for the particular object instance, such as a segmentation mask indicating which pixels (e.g., of the modified input image 850) are included in the particular object instance. A mask logits layer 835 calculates, for each categorized object, a respective probability that the instance head 830 has generated a correct segmentation mask for the particular object instance. An output from the instance head 830, such as an instance output 838, can include (or otherwise indicate), for each categorized object, one or more of the bounding box, classification, segmentation mask, or the respective probabilities for the segmentation mask.

In some implementations, the modified PLNN 800 includes at least one tiebreaker layer, such as a tiebreaker layer 840. The tiebreaker layer 840 is configured, for example, to determine a categorization of an object instance that has multiple categorizations indicating different object categories. For example, if a particular object depicted in the modified input image 850 has a first categorization of "person" indicated by the semantic output 828 and a second categorization of "tree" indicated for the instance output 838, the tiebreaker layer 840 can apply one or more resolution techniques to determine a correct categorization for the particular object. Additionally or alternatively, the tiebreaker layer 840 could modify one or more of the instance output 838 or the semantic output 828, such as modifying a categorization that does not agree with the correct categorization determined by the resolution techniques. Continuing with the above example, if the tiebreaker layer 840 determines that the correct categorization is "person," the instance output 838 could be modified such that the second categorization indicates "person." A non-limiting example of a resolution technique is to apply a softmax function to multiple categorizations for a particular object instance, but any suitable resolution technique may be used. In some cases, such as if the multiple categorizations are in agreement (e.g., indicate a same or similar categorization), the particular object instance could bypass the tiebreaker layer 840 (e.g., resolution techniques are not applied to the particular object instance).

In FIG. 8, the panoptic head 860 receives an indication of a respective object categorization for each object depicted in the modified input image 850. For example, the panoptic head 860 receives one or more of the instance output 838, the semantic output 828, or an output from the tiebreaker layer 840. Additionally or alternatively, the panoptic head 860 is configured to generate labels for one or more pixels included in the modified input image 850, based on the received outputs. For example, each label indicates one or more of an object category to which a respective pixel belongs, or an object instance in which the pixel is included. A panoptic logits layer 865 calculates, for each labeled pixel, a respective probability that the panoptic head 860 has generated a correct label for the pixel. An output from the panoptic head 860, such as a panoptic output 868, can include (or otherwise indicate) the label for each labeled pixel.

In some implementations, a label for a pixel could indicate an object category for the pixel. The label could indicate an object instance for the pixel, or whether or not the pixel is included in an object that has instances. For example, an image could depict objects that can have countable instances, such as a quantity of people. The example label could indicate that the pixel is included in a countable object, and could also indicate which particular instance of the countable object includes the pixel (e.g., which countable thing includes the pixel). In addition, the image could depict objects that do not have countable instances, such as sky, water, ground, or other objects that belong to a particular depicted entity. The example label could indicate that the pixel is included in a non-countable object.

Figure 9:
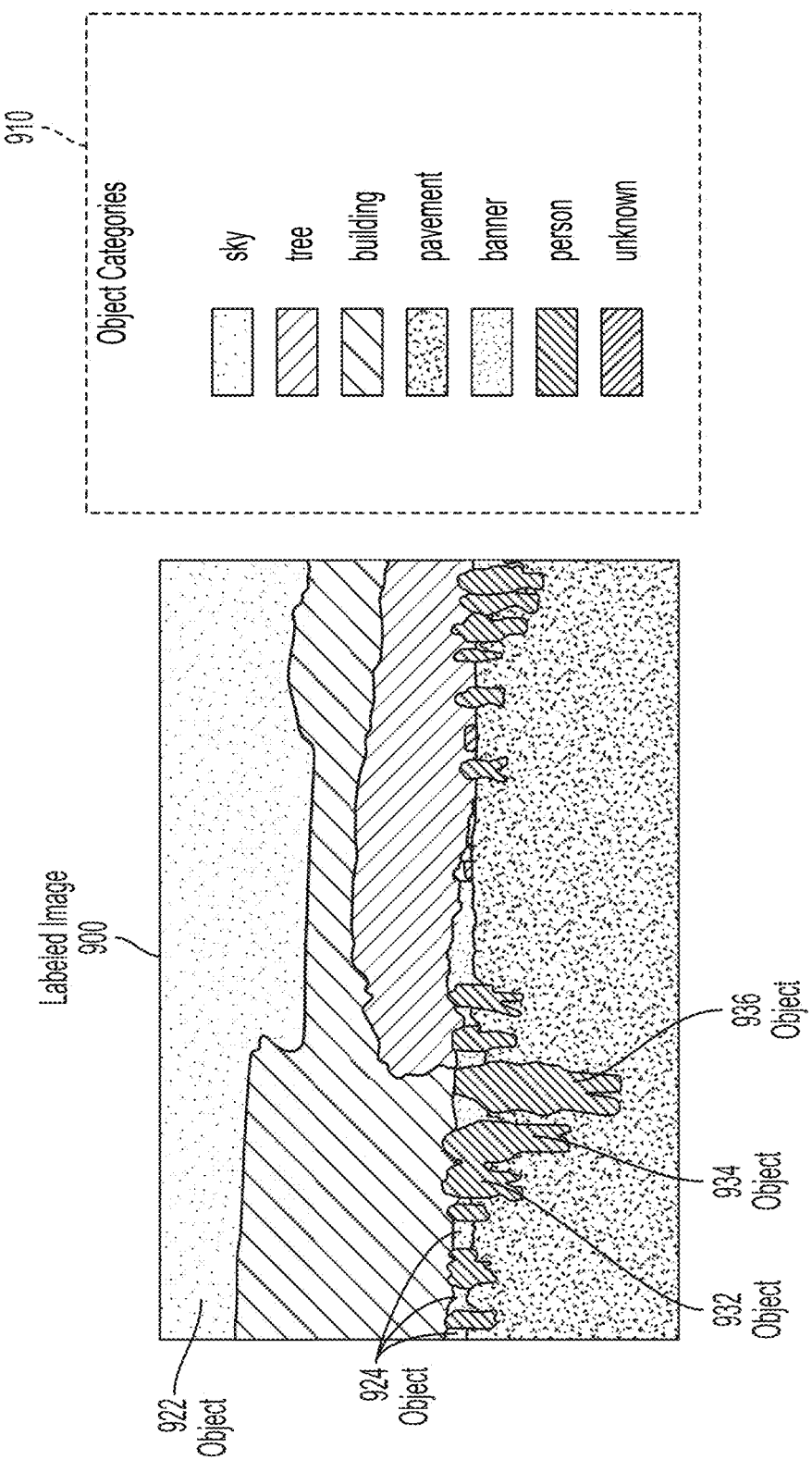
FIG. 9 is a diagram depicting an example labeled image in which labels have been generated for pixels of the image, according to certain embodiments.

FIG. 9 is a diagram depicting an example of an image in which labels have been generated for pixels of the image, such as a labeled image 900. In the labeled image 900, pixels are associated with respective labels generated by a modified PLNN, such as described elsewhere herein. For convenience, and not by way of limitation, the labeled image 900 is depicted as having labels indicated by visual patterns, but other implementations are possible. For example, labels could be indicated by a vector of text (or other suitable data structure or data type) that indicates one or more of a label for a respective pixel, a location of the respective pixel, or any other suitable information related to the labels.

In FIG. 9, the labeled image 900 depicts (or otherwise represents) multiple objects, including an object 922, an object 924, an object 932, an object 934, and an object 936. For each pixel in the labeled image 900, the respective label indicates an object category to which the pixel belongs, such as a category from object categories 910. As a non-limiting example, the object categories 910 indicate categories including "sky," "tree," "building," "pavement," "banner," "person," and "unknown." Each pixel in the image 900 is associated with a label indicating a respective one of the object categories 910. For example, pixels included in the object 922 have respective labels indicating the "sky" category. Additionally or alternatively, pixels in the object 924 have respective labels indicating the "banner" category, and pixels in the objects 932, 934, and 936 have respective labels indicating the "person" category.

In some cases, the respective label indicates an object instance for the pixel, such as a countable instance of the object to which the pixel belongs. For example, a first pixel included in the object 932 can have a label <Person, 1> indicating that the first pixel belongs to object instance 1 having the category "person." A second pixel in the object 934 can have a label <Person, 2> indicating that the second pixel belongs to object instance 2 having the category "person," and a third pixel in the object 936 can have a label <Person, 3> indicating that the third pixel belongs to object instance 3 having the category "person."

Additionally or alternatively, the respective label omits an object instance for the pixel, or indicates that there is not a countable instance of the object to which the pixel belongs. For example, a fourth pixel included in the object 922 can have a label of <Sky> or <Sky, 0> indicating that the fourth pixel belongs to a non-countable object having the category "sky." In some cases, a non-countable object can be visually separated by other objects. For example, in the labeled image 900, the object 924 having the category "banner" is separated into portions, such as by additional objects having the category "person." In some cases, multiple pixels included in various portions of the object 924 (e.g., as indicated in FIG. 9) can each have a respective label of <Banner> or <Banner, 0> indicating that the multiple pixels belongs to a non-countable object having the category "banner."

Figure 10:
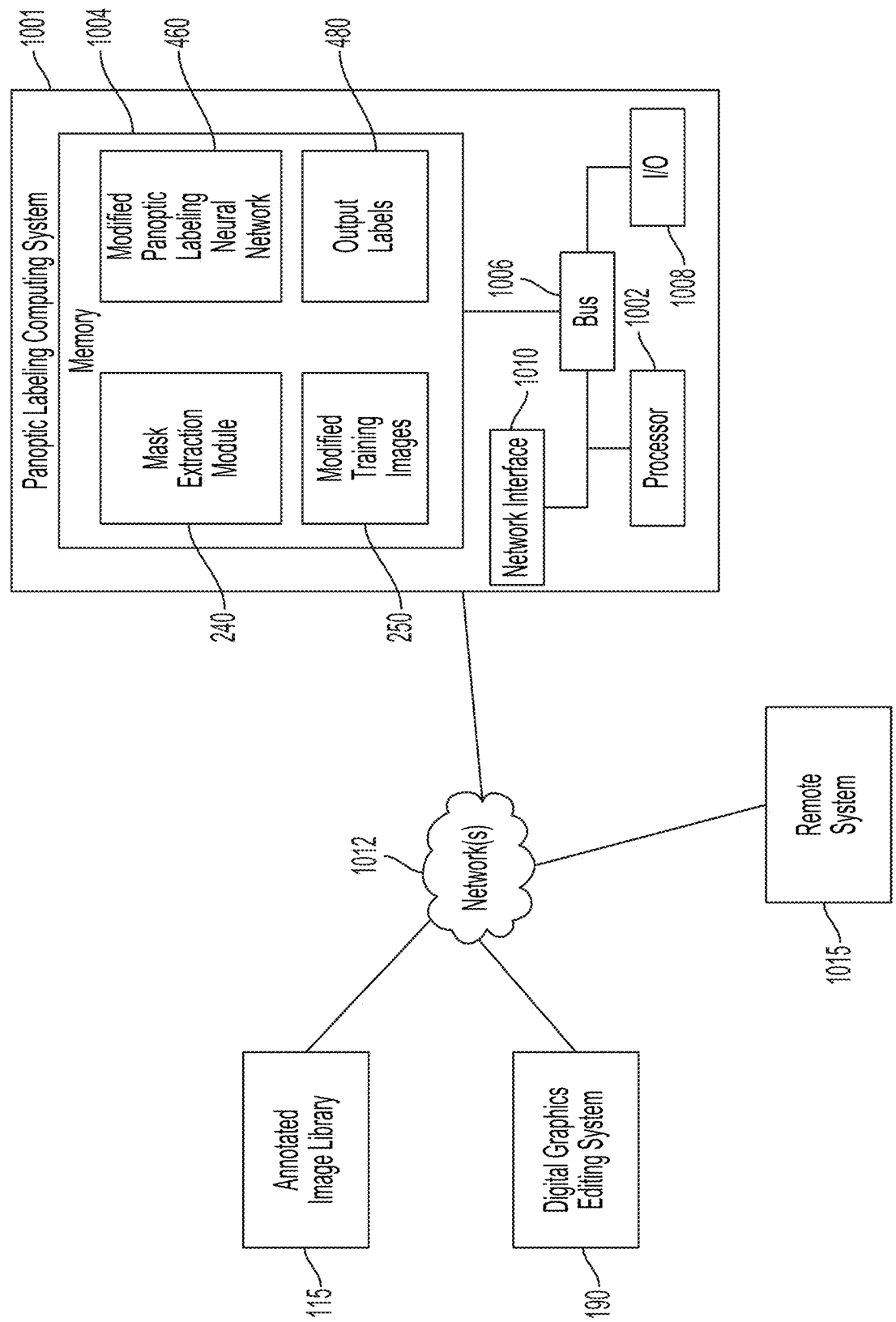
FIG. 10 is a diagram depicting an example of a computing system for implementing a panoptic labeling system, according to certain embodiments.

Any suitable computing system or group of computing systems can be used for performing the operations described herein. For example, FIG. 10 is a block diagram depicting a computing system that is configured as a panoptic labeling system, according to certain embodiments.

The depicted example of a computing system 1001 includes one or more processors 1002 communicatively coupled to one or more memory devices 1004. The processor 1002 executes computer-executable program code or accesses information stored in the memory device 1004. Examples of processor 1002 include a microprocessor, an application-specific integrated circuit ("ASIC"), a field-programmable gate array ("FPGA"), or other suitable processing device. The processor 1002 can include any number of processing devices, including one.

The memory device 1004 includes any suitable non-transitory computer-readable medium for storing the mask extraction module 240, the modified PLNN 460, the modified training images 250, the output labels 480, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1001 may also include a number of external or internal devices such as input or output devices. For example, the computing system 1001 is shown with an input/output ("I/O") interface 1008 that can receive input from input devices or provide output to output devices. A bus 1006 can also be included in the computing system 1001. The bus 1006 can communicatively couple one or more components of the computing system 1001.

The computing system 1001 executes program code that configures the processor 1002 to perform one or more of the operations described above with respect to FIGS. 1-9. The program code includes operations related to, for example, one or more of the mask extraction module 240, the modified PLNN 460, the modified training images 250, the output labels 480, or other suitable applications or memory structures that perform one or more operations described herein. The program code may be resident in the memory device 1004 or any suitable computer-readable medium and may be executed by the processor 1002 or any other suitable processor. In some embodiments, the program code described above, the mask extraction module 240, the modified PLNN 460, the modified training images 250, and the output labels 480 are stored in the memory device 1004, as depicted in FIG. 10. In additional or alternative embodiments, one or more of the mask extraction module 240, the modified PLNN 460, the modified training images 250, the output labels 480, and the program code described above are stored in one or more memory devices accessible via a data network, such as a memory device accessible via a cloud service.

The computing system 1001 depicted in FIG. 10 also includes at least one network interface 1010. The network interface 1010 includes any device or group of devices suitable for establishing a wired or wireless data connection to one or more data networks 1012. Non-limiting examples of the network interface 1010 include an Ethernet network adapter, a modem, and/or the like. A remote system 1015 is connected to the computing system 1001 via network 1012, and remote system 1015 can perform some of the operations described herein, such as extracting features or providing annotations of images. The computing system 1001 is able to communicate with one or more of the remote computing system 1015, the annotated image library 115, or the digital graphics editing system 190 using the network interface 1010. Although FIG. 10 depicts the annotated image library 115 and the digital graphics editing system 190 as connected to computing system 1001 via the networks 1012, other embodiments are possible, including the library 115 or editing system 190 running as additional programs in the memory 1004 of computing system 1001.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of generating panoptic labeling for graphical digital images, the method comprising:
   generating a modified input image based on an input image and a mask instance;
   determining a set of labels, each label in the set of labels representing a category of an object depicted in one or more training images in a group of training images;
   determining a subset of the set of labels, each label in the subset representing a respective category of a respective object depicted in the input image;
   determining, by a modified panoptic labeling neural network, a distance between a mask pixel from the mask instance and an object pixel from the modified input image, the object pixel having a label from the subset;
   determining, by the modified panoptic labeling neural network and based on the distance, a probability of the mask pixel having the label from the subset;
   generating, by the modified panoptic labeling neural network, a mask label for the mask pixel based on the probability; and
   providing the mask label to a digital graphics editing system.

2. The method of claim 1, further comprising additional operations performed by the modified panoptic labeling neural network, the additional operations comprising:
   determining a first cross-entropy of the subset, wherein the first cross-entropy is modified based on the distance,
   determining a second cross-entropy of the set of labels exclusive of the subset, wherein the second cross-entropy is modified based on a weighting factor; and
   determining, by the modified panoptic labeling neural network, a loss based on a sum of the modified first cross-entropy and the modified second cross-entropy,
   wherein the probability of the mask pixel having the label from the subset is further based on the loss.

3. The method of claim 1, further comprising:
   determining a boundary region of the mask instance, the boundary region including (i) an inner region that includes a first subset of pixels of the mask instance, the first subset of pixels including one or more pixels adjacent to pixels in the modified input image, and (ii) an outer region that includes a second subset of pixels of the modified input image, the second subset of pixels including one or more pixels adjacent to pixels in the mask instance; and determining, by the modified panoptic labeling neural network and for each pixel in the boundary region, a loss based on a variation between the pixel in the boundary region and an adjacent pixel in the boundary region, wherein the probability of the mask pixel having the label from the subset is further based on the loss.

4. The method of claim 3, wherein the subset of the set of labels is determined based on the second subset of pixels included in the boundary region.

5. The method of claim 1, wherein the mask instance is selected based on a similarity between a first feature vector associated with the modified input image and a second feature vector associated with an annotated image.

6. The method of claim 1, further comprising:
extracting, via a feature-extraction neural network, a feature vector of the modified input image;
extracting, via the feature-extraction neural network and for each annotated image in an annotated image library, an additional feature vector of the annotated image;
comparing the feature vector to each additional feature vector; and
responsive to determining that a particular feature vector of a particular annotated image is within a similarity threshold of the feature vector of the modified input image, selecting the mask instance from a particular annotated image.

7. The method of claim 6, wherein generating the modified input image comprises generating multiple channels of the modified input image, wherein at least one channel indicating a color of the input image and at least one channel indicating the mask instance,
wherein the modified panoptic labeling neural network receives the modified input image as an input.

8. A non-transitory computer-readable medium embodying program code for training a modified panoptic labeling neural network, the program code comprising instructions which, when executed by a processor, cause the processor to perform operations comprising:
receiving an input image that is included in a group of training images;
extracting a feature vector of the input image;
extracting, for each annotated image in an annotated image library, an additional feature vector of the annotated image, wherein the annotated image library excludes the input image and the group of training images;
a step for determining at least one annotated image based on the feature vector and each additional feature vector;
a step for determining, for each mask pixel in a mask instance from the at least one annotated image, a probability of the mask pixel having a label that represents a category of an object depicted in the input image; and
a step for generating, for each mask pixel in the mask instance, a mask label for the mask pixel, wherein the mask label is based on the probability.

9. The non-transitory computer-readable medium of claim 8, the operations further comprising, for each mask pixel in the mask instance:
determining a distance between the mask pixel and an object pixel in the input image;
determining a first cross-entropy of a first set of labels, wherein each label in the first set of labels represents a respective category of a respective object depicted in the input image, wherein the first cross-entropy is modified based on the distance,
determining a second cross-entropy of a second set of labels, wherein each label in the second set of labels represents an additional category of an additional object depicted in at least one additional image from the group of training images, wherein the second cross-entropy is modified based on a weighting factor; and
a step for determining a loss based on a sum of the modified first cross-entropy and the modified second cross-entropy,
wherein the probability of the mask pixel is based on the loss.

10. The non-transitory computer-readable medium of claim 8, the operations further comprising:
a step for identifying a boundary region of the mask instance, the boundary region including (i) an outer region that includes a first subset of pixels of the input image, the first subset of pixels including one or more pixels adjacent to pixels in the mask instance, and (ii) an inner region that includes a second subset of pixels of the mask instance, the second subset of pixels including one or more pixels adjacent to pixels in the input image; and
a step for determining, for each pixel in the boundary region, a loss based on a variation between the pixel in the boundary region and an adjacent pixel in the boundary region,
wherein the probability of the mask pixel is based on the loss.

11. The non-transitory computer-readable medium of claim 8, the operations further comprising a step for modifying the input image to include at least one channel indicating a color of the input image and at least one channel indicating the mask instance,
wherein a modified panoptic labeling neural network receives the modified input image as an input.

12. The non-transitory computer-readable medium of claim 11, wherein the mask instance is transformed before inclusion in the modified input image.

13. The non-transitory computer-readable medium of claim 12, wherein the transformation includes one or more of: rotation, scaling, or translation.

14. The non-transitory computer-readable medium of claim 8, wherein the mask instance indicates an additional object that is depicted in the annotated image, and wherein the additional object has an additional category that matches the category of the object depicted in the input image.

15. A system for generating panoptic labeling for graphical digital images, the system comprising:
a mask extraction module configured for selecting, from a library of annotated images, a mask instance describing an annotated object depicted a particular one of the annotated images;
a label extraction module configured for determining (i) a first set of labels, wherein each label in the first set of labels represents a respective category of a respective object depicted in an input image included in a group of training images, and (ii) a second set of labels, wherein each label in the second set of labels represents an additional category of an additional object depicted in at least one additional image from the group of training images; and
a modified panoptic labeling neural network configured for:
determining, for each mask pixel in the mask instance, a distance between the mask pixel and an object pixel in the input image, the object pixel having a respective label from the first set of labels;

determining, based on the distance, a respective probability of the mask pixel having the respective label from the first set of labels;

generating, for each mask pixel in the mask instance, a mask label for the mask pixel, wherein the mask label is based on the respective probability; and providing, for each mask pixel in the mask instance, the mask label to a digital graphics editing system.

16. The system of claim 15, wherein the modified panoptic labeling neural network is further configured for:

determining a first cross-entropy of the first set of labels, wherein the first cross-entropy is modified based on the distance, determining a second cross-entropy of the second set of labels exclusive of the first set of labels, wherein the second cross-entropy is modified based on a weighting factor; and determining, by the modified panoptic labeling neural network, a loss based on a sum of the modified first cross-entropy and the modified second cross-entropy, wherein the respective probability of the mask pixel is further based on the loss.

17. The system of claim 15, wherein the label extraction module is further configured for:

determining a boundary region of the mask instance, the boundary region including (i) an outer region that includes a first subset of pixels of the input image, the first subset of pixels including one or more pixels adjacent to pixels in the mask instance, and (ii) an inner region that includes a second subset of pixels of the mask instance, the second subset of pixels including one or more pixels adjacent to pixels in the input image; and determining, by the modified panoptic labeling neural network and for each pixel in the boundary region, a loss based on a variation between the pixel in the boundary region and an adjacent pixel in the boundary region, wherein the respective probability of the mask pixel is further based on the loss.

18. The system of claim 17, wherein the first set of labels is determined based on the first subset of pixels included in the boundary region.

19. The system of claim 15, wherein the mask extraction module is further configured for:

extracting, via a feature-extraction neural network, a feature vector of the input image;

extracting, via the feature-extraction neural network and for each annotated image in the library of annotated images, an additional feature vector of the annotated image, wherein the library of annotated images excludes the input image;

determining, based on a comparison of the feature vector to each additional feature vector, a group of the annotated images, wherein the group includes the particular one of the annotated images; and responsive to determining that a particular feature vector of the particular one of the annotated images is within a similarity threshold of the feature vector of the input image, selecting the mask instance from the particular one of the annotated images.

20. The system of claim 19, wherein the mask extraction module is further configured for modifying the input image to include at least one channel indicating a color of the input image and at least one channel indicating the mask instance, wherein the modified panoptic labeling neural network is further configured for receiving the modified input image as an input.

\* \* \* \* \*